US011917201B2

(12) United States Patent
Kuma et al.

(10) Patent No.: US 11,917,201 B2
(45) Date of Patent: Feb. 27, 2024

(54) INFORMATION PROCESSING APPARATUS AND INFORMATION GENERATION METHOD

(71) Applicant: Sony Group Corporation, Tokyo (JP)

(72) Inventors: Satoru Kuma, Tokyo (JP); Ohji Nakagami, Tokyo (JP); Tsuyoshi Kato, Tokyo (JP); Koji Yano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 239 days.

(21) Appl. No.: 17/437,051

(22) PCT Filed: Dec. 24, 2019

(86) PCT No.: PCT/JP2019/050472
§ 371 (c)(1),
(2) Date: Sep. 8, 2021

(87) PCT Pub. No.: WO2020/188932
PCT Pub. Date: Sep. 24, 2020

(65) Prior Publication Data
US 2022/0182670 A1 Jun. 9, 2022

Related U.S. Application Data

(60) Provisional application No. 62/819,149, filed on Mar. 15, 2019.

(51) Int. Cl.
H04N 7/12 (2006.01)
H04N 19/597 (2014.01)
H04N 19/85 (2014.01)

(52) U.S. Cl.
CPC ............ *H04N 19/597* (2014.11); *H04N 19/85* (2014.11)

(58) Field of Classification Search
CPC ........ H04N 19/597; H04N 19/85; H04N 19/70
(Continued)

(56) References Cited

U.S. PATENT DOCUMENTS 11,367,224 B2 * 6/2022 Mammou ............ H04N 19/597
11,422,565 B1 * 8/2022 Webster ................ B25J 13/088
(Continued)

OTHER PUBLICATIONS

International Search Report and Written Opinion dated Mar. 24, 2020, received for PCT Application PCT/JP2019/050472, Filed on Dec. 24, 2019, 7 pages including English Translation.
(Continued)

*Primary Examiner* — Gims S Philippe
(74) *Attorney, Agent, or Firm* — XSENSUS LLP

(57) ABSTRACT

The present disclosure relates to an information processing apparatus and an information generation method that enable suppression of deterioration in subjective quality of a point cloud.
There is generated an occupancyMap indicating, for each local area of a frame image, presence or absence of a projection image of a point cloud on a two-dimensional plane in accordance with a positional relationship of points in a three-dimensional space, while the point cloud represents an object having a three-dimensional shape as a set of the points. The present disclosure can be applied to, for example, an information processing apparatus, an encoding device, a decoding device, or the like.

19 Claims, 13 Drawing Sheets

(58) Field of Classification Search
USPC .................................................. 375/240.08
See application file for complete search history.

(56) References Cited

U.S. PATENT DOCUMENTS

2019/0329407 A1* 10/2019 Qi ........................ G05D 1/0248
2021/0281880 A1* 9/2021 Litwic .................. H04N 19/184
2021/0337237 A1* 10/2021 Zakharchenko ........ G06T 9/001

OTHER PUBLICATIONS

Mammou et al., "Video-based and Hierarchical Approaches Point Cloud Compression", Apple Inc., ISO/IEC JTC1/SC29/WG11 m41649, Oct. 2017, 3 pages.

Golla et al., "Real-time Point Cloud Compression", IEEE, 2015, 6 pages.

"Information Technology—MPEG-I (Coded Representation of Immersive Media)—Part 9: Geometry-Based Point Cloud Compression", ISO/IEC 23090-9:2019(E), ISO/IEC JTC 1/SC 29/WG 11, Secretariat: JISC, CD stage, 2019, pp. 1-96.

Mekuria et al., "Design, Implementation and Evaluation of a Point Cloud Codec for Tele-Immersive Video", IEEE Transactions on Circuits and Systems for Video Technology, Jan. 2016, pp. 1-14.

Mammou, "PCC Test Model Category 2 v0", 3DG, ISO/IEC JTC1/SC29/WG11 N17248, Oct. 2017, 11 pages.

Schwarz et al., "Emerging MPEG Standards for Point Cloud Compression", IEEE Journal on Emerging and Selected Topics in Circuits and Systems, vol. 9, No. 1, Mar. 2019, pp. 133-148.

Gueda et al., "PCC New Proposal: Improve Point Cloud Compression Through Occupancy Map Refinement", Technicolor, ISO/IEC JTC1/SC29/WG11 MPEG2018/m44779, 124th Meeting, Oct. 2018, 7 pages.

Cao et al., "Patch-Aware Averaging Filter for Scaling in Point Cloud Compression", IEEE Global Conference on Signal and Information Processing (Global SIP), Nov. 26, 2018, pp. 390-394.

Zakharchenko, "V-PCC Codec Description", 3DG, ISO/IEC JTC1/SC29/WG11 MPEG2019/N18190, Jan. 2019, 38 pages.

* cited by examiner

FIG. 3

| | | | | | | | |
|---|---|---|---|---|---|---|---|
| 1 | OCCUPANCYMAP CORRESPONDING TO 3D POSITION OF POINT IS GENERATED | | | | | | |
| | 1-1 | FILTER CONTROL IS PERFORMED IN ACCORDANCE WITH DISTANCE WITH NEIGHBORING POINT FOR DISAPPEARED POINT DUE TO FILTERING | | | | | |
| | | 1-1-1 | CONTROL BASED ON WHETHER POINT IS PRESENT WITHIN DISTANCE r FROM DISAPPEARED POINT DUE TO FILTERING | | | | |
| | | | 1-1-1-1 | DISTANCE r: DISTANCE ON THREE-DIMENSIONAL SPACE | | | |
| | | | 1-1-1-2 | DISTANCE r: DISTANCE ON PROJECTION PLANE | | | |
| | | | 1-1-1-3 | DISTANCE r: DISTANCE IN NORMAL DIRECTION OF PROJECTION PLANE | | | |
| | | 1-1-2 | CONTROL BASED ON NUMBER OF POINTS WITHIN DISTANCE r FROM DISAPPEARED POINT DUE TO FILTERING | | | | |
| | | 1-1-3 | CONDITION CONTROL IN ACCORDANCE WITH POSITION OF DISAPPEARED POINT DUE TO FILTERING | | | | |
| | 1-2 | RECONFIGURATION PROCESS BEFORE AND AFTER FILTERING | | | | | |
| | | 1-2-1 | WITH Smoothing | | | | |
| | | 1-2-2 | WITHOUT Smoothing | | | | |

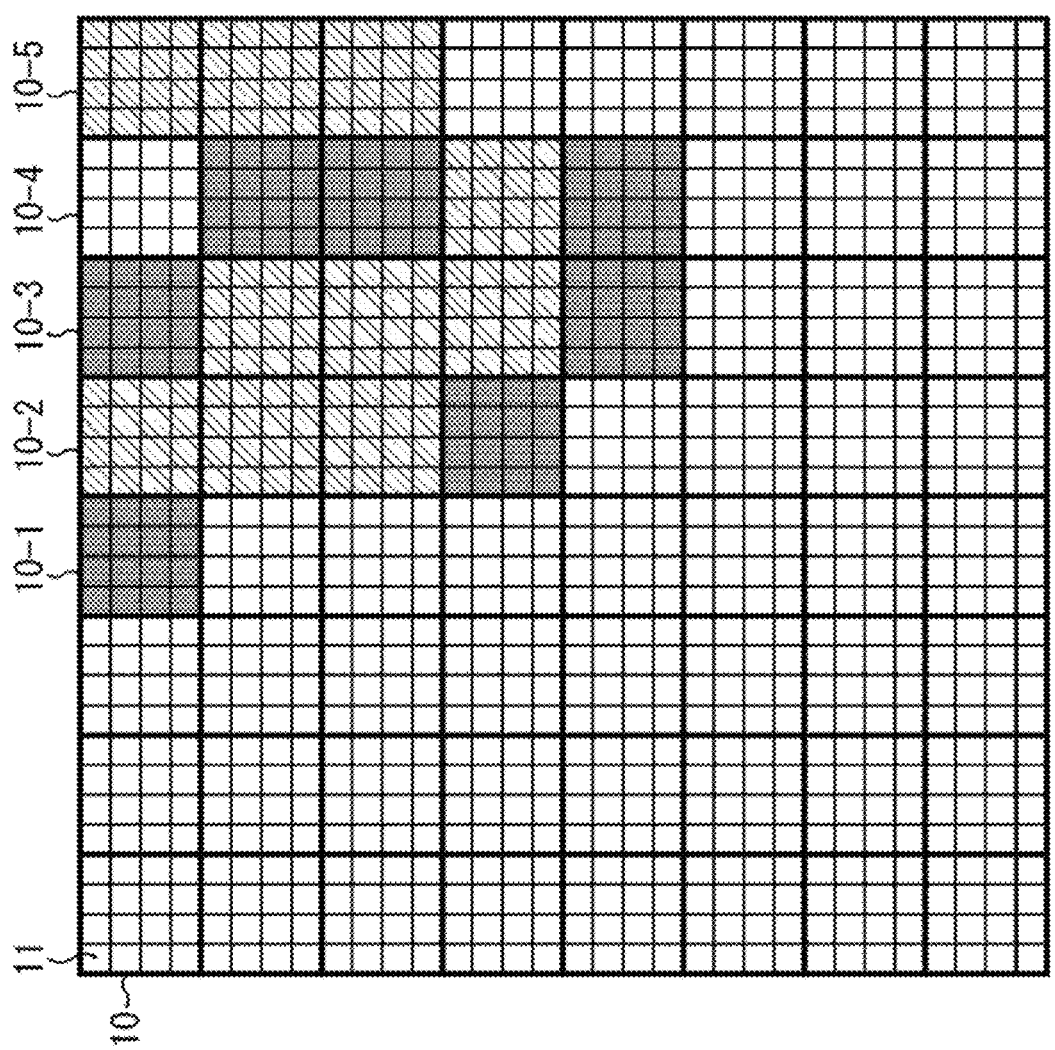

INFORMATION PROCESSING APPARATUS AND INFORMATION GENERATION METHOD

CROSS-REFERENCE TO RELATED APPLICATIONS

The present application is based on PCT filing PCT/JP2019/050472, filed Dec. 24, 2019, which claims priority to U.S. Provisional Patent Application No. 62/819,149, filed Mar. 15, 2019, the entire contents of each are incorporated herein by reference.

TECHNICAL FIELD

The present disclosure relates to an information processing apparatus and an information generation method, and particularly relates to an information processing apparatus and an information generation method that enable suppression of deterioration in subjective quality of a point cloud.

BACKGROUND ART

Conventionally, encoding and decoding of point cloud data representing an object having a three-dimensional shape as a set of points has been standardized by a moving picture experts group (MPEG) (see, for example, Non Patent Document 1 and Non Patent Document 2).

Furthermore, there has been proposed a method (hereinafter, also referred to as a video-based approach) of projecting position information and attribute information of a point cloud onto a two-dimensional plane for each small region, arranging an image (patch) projected onto the two-dimensional plane in a frame image, and encoding the frame image by an encoding method for a two-dimensional image (see, for example, Non Patent Document 3 to Non Patent Document 6).

For an occupancyMap used in the video-based approach, a method of performing filtering so as not to cause a large remainder has been proposed (see, for example, Non Patent Document 7).

CITATION LIST

Non Patent Document

Non Patent Document 1: "Information technology—MPEG-I (Coded Representation of Immersive Media)—Part 9: Geometry-based Point Cloud Compression", ISO/IEC 23090-9:2019(E)
Non Patent Document 2: R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf
Non Patent Document 3: Tim Golla and Reinhard Klein, "Real-time Point Cloud Compression," IEEE, 2015
Non Patent Document 4: K. Mammou, "Video-based and Hierarchical Approaches Point Cloud Compression", MPEG m41649, October 2017
Non Patent Document 5: K. Mammou, "PCC Test Model Category 2 v0," N17248 MPEG output document, October 2017
Non Patent Document 6: Vladyslav Zakharchenko, V-PCC Codec description, ISO/IEC JTC1/SC29/WG11 MPEG2019/N18190, Marrakech, M A, January 2019
Non Patent Document 7: C. Guede, J. Ricard, J. Llach, J-C. Chevet, Y. Olivier, D. Gendron, "[PCC] new proposal: Improve point cloud compression through occupancy map refinement", ISO/IEC JTC1/SC29 WG11 Doc. m44779, Macao, China, October 2018

SUMMARY OF THE INVENTION

Problems to be Solved by the Invention

However, in a method using a fixed filter described in Non Patent Document 7, there has been a possibility that points that are not originally desired to be dropped are dropped, and that the subjective quality of the point cloud is deteriorated.

The present disclosure has been made in view of such a situation, and an object thereof is to suppress deterioration in subjective quality of a point cloud.

Solutions to Problems

An information processing apparatus of one aspect of the present technology is an image processing apparatus including: a generation unit configured to generate an occupancyMap indicating, for each local area of a frame image, presence or absence of a projection image of a point cloud on a two-dimensional plane in accordance with a positional relationship of points in a three-dimensional space, the point cloud representing an object having a three-dimensional shape as a set of the points.

An information generation method of one aspect of the present technology is an information generation method including: generating an occupancyMap indicating, for each local area of a frame image, presence or absence of a projection image of a point cloud on a two-dimensional plane in accordance with a positional relationship of points in a three-dimensional space, the point cloud representing an object having a three-dimensional shape as a set of the points.

An information processing apparatus of another aspect of the present technology is an image processing apparatus including: an extraction unit configured to extract a projection image of geometry data and a projection image of attribute data of a point cloud from a frame image by using an occupancyMap that is generated in accordance with a positional relationship of points in a three-dimensional space of the point cloud representing an object having a three-dimensional shape as a set of the points, the occupancyMap indicating, for each local area of a frame image, presence or absence of a projection image of the point cloud on a two-dimensional plane; and a generation unit configured to generate the point cloud by using the projection image of the geometry data and the projection image of the attribute data that have been extracted by the extraction unit.

An information generation method of another aspect of the present technology is an information generation method including: extracting, from a frame image, a projection image of geometry data and a projection image of attribute data of a point cloud by using an occupancyMap that is generated in accordance with a positional relationship of points in a three-dimensional space of a point cloud representing an object having a three-dimensional shape as a set of the points, the occupancyMap indicating, for each local area of a frame image, presence or absence of a projection image of the point cloud on a two-dimensional plane; and generating the point cloud by using the projection image of the geometry data and the projection image of the attribute data that have been extracted.

In the information processing apparatus and the information generation method of one aspect of the present technology, there is generated the occupancyMap indicating, for each local area of a frame image, presence or absence of a projection image of a point cloud on a two-dimensional plane in accordance with a positional relationship of points in a three-dimensional space, the point cloud representing an object having a three-dimensional shape as a set of the points.

In the information processing apparatus and the information generation method of another aspect of the present technology, a projection image of geometry data and a projection image of attribute data of a point cloud are extracted from a frame image by using an occupancyMap that is generated in accordance with a positional relationship of points in a three-dimensional space of the point cloud representing an object having a three-dimensional shape as a set of the points, the occupancyMap indicating, for each local area of a frame image, presence or absence of a projection image of the point cloud on a two-dimensional plane, and the point cloud is generated by using the projection image of the geometry data and the projection image of the attribute data that have been extracted.

BRIEF DESCRIPTION OF DRAWINGS

FIG. 3 is a view for explaining a method of generating an occupancyMap.

FIG. 4 is a view illustrating an example of comparison of an occupancyMap before and after application of the fixed filter.

MODE FOR CARRYING OUT THE INVENTION

Figure 1:
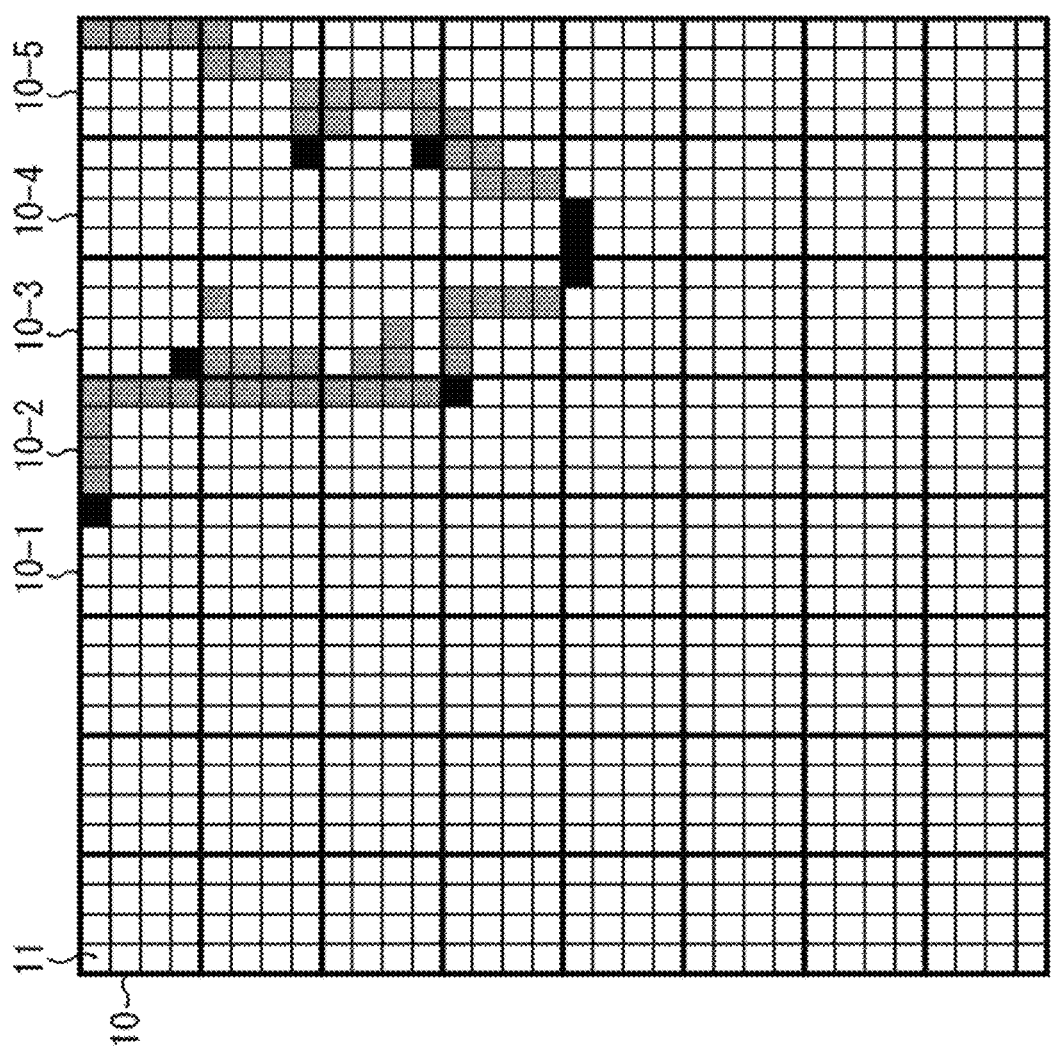
FIG. 1 is a view illustrating an example of a 1×1-accuracy occupancyMap.

Hereinafter, an embodiment for implementing the present disclosure (hereinafter, referred to as an embodiment) will be described. Note that the description will be given in the following order.

1. Filtering of occupancyMap in consideration of three-dimensional position information
2. First embodiment (encoding device)
3. Second embodiment (decoding device)
4. Supplementary note 1. FILTERING OF OCCUPANCYMAP IN CONSIDERATION OF THREE-DIMENSIONAL POSITION INFORMATION <Documents and the Like that Support Technical Contents and Technical Terms>

The scope disclosed in the present technology includes, in addition to the contents described in the embodiments, contents described in the following Non Patent Documents and the like known at the time of filing, contents of other documents referred to in the following Non Patent Documents, and the like.

Non Patent Document 1: (described above)
Non Patent Document 2: (described above)
Non Patent Document 3: (described above)
Non Patent Document 4: (described above)
Non Patent Document 5: (described above)
Non Patent Document 6: (described above)
Non Patent Document 7: (described above)

That is, the contents described in the above-described Non Patent Documents, the contents of other documents referred to in the above-described Non Patent Documents, and the like are also basis for determining the support requirement.

<Point Cloud>

Conventionally, there has been 3D data such as a point cloud representing a three-dimensional structure with point position information, attribute information, and the like.

For example, in a case of a point cloud, a three-dimensional structure (object having a three-dimensional shape) is expressed as a set of a large number of points. Data of the point cloud (also referred to as point cloud data) includes position information (also referred to as geometry data) and attribute information (also referred to as attribute data) of each point. The geometry data is information indicating a position of the point in the three-dimensional space, and includes, for example, orthogonal coordinates (x, y, z) or the like. Of course, any coordinate system other than the orthogonal coordinate system can be applied to the geometry data. The attribute data is information other than the position information regarding the point, and can include any information. For example, color information, reflectance information, normal line information, and the like of each point may be included in the attribute data. As described above, the point cloud data has a relatively simple data structure, and can express any three-dimensional structure with sufficient accuracy by using a sufficiently large number of points.

<Encoding of Point Cloud>

Since such point cloud data has a relatively large data amount, for example, as described in Non Patent Document 1 and Non Patent Document 2, a method for encoding and decoding point cloud data has been proposed.

<Overview of Video-Based Approach>

For example, as described in Non Patent Documents 3 to 6, there has been proposed a video-based approach of projecting geometry data and attribute data of such a point cloud onto a two-dimensional plane for each small region, arranging an image (patch) projected onto the two-dimensional plane in a frame image, and encoding the frame image by an encoding method for a two-dimensional image.

In this video-based approach, such a point cloud is divided into a plurality of small regions, and each point is projected onto a two-dimensional plane (also referred to as a projection plane) for each small region. This projection is performed for each of the geometry data and the attribute data. The image projected on the projection plane is also referred to as a projection image. Furthermore, the projection image for each small region is also referred to as a patch.

Then, each patch generated in this way is arranged in the frame image. The frame image in which the patch of geometry data is arranged is also referred to as a geometry video frame. Furthermore, the frame image in which the patch of the attribute data is arranged is also referred to as a color video frame. For example, each pixel value of the geometry video frame indicates position information (a depth value (Depth)) in a vertical direction (depth direction) with respect to the projection plane of the point corresponding to the pixel.

Each video frame generated in this way is encoded by an encoding method for a two-dimensional image, such as, for example, advanced video coding (AVC) or high efficiency video coding (HEVC). Of course, any method may be adopted for this encoding method without limiting to AVC or HEVC.

The encoded data generated in this way is transmitted to a decoding side, and is decoded on the decoding side to generate a frame image. Then, each patch is extracted from the frame image, and 3D data such as a point cloud is constructed from each patch.

<OccupancyMap>

In a case of such a video-based approach, an occupancyMap can be further used. The occupancyMap is map information indicating the presence or absence of a projection image (patch) of the geometry video frame, with predetermined pixel accuracy. For example, the occupancyMap indicates the presence or absence of a patch for each region of N×N pixel accuracy, that is, N×N pixels. For example, in the occupancyMap, a region of N×N pixels where the patch is present is indicated by a value "1", and a region of N×N pixels where no patch is present is indicated by a value "0". In other words, it can also be said that the occupancyMap is binary mask information (Binary mask).

Such an occupancyMap is encoded as data separate from the geometry video frame and the color video frame, and transmitted to the decoding side. A decoder can grasp whether or not a patch is present in the region by referring to this occupancyMap, so that an influence of noise or the like caused by encoding and decoding can be suppressed. For example, even if the depth value changes due to encoding and decoding, the decoder can ignore a pixel value of a region where no patch is present by referring to the occupancyMap. Therefore, for example, even if a pixel value indicating absence of a point changes to a pixel value indicating presence of a point by encoding and decoding in the pixel in the region where no patch is present, the decoder can be prevented from processing a pixel value of such a pixel as the position information of the 3D data by referring to the occupancyMap.

FIG. 1 illustrates an example of an occupancyMap of 1×1 pixel accuracy. In FIG. 1, each of small squares indicates a pixel (pixel 11) of a frame image. That is, FIG. 1 illustrates a part or all of the frame image. The pixel 11 in gray or black indicates a pixel corresponding to a point. Furthermore, a region 10 surrounded by a thick line is a region of 4×4 pixels.

In a case of 1×1 pixel accuracy, the occupancyMap can accurately express the presence or absence of existence in units of points as illustrated in FIG. 1. However, in this case, an information amount corresponding to the number of pixels is required for the occupancyMap. Therefore, there has been a possibility that encoding efficiency is deteriorated. In particular, since the occupancyMap is not information constituting a point cloud, it is more preferable as the information amount is smaller.

Therefore, in a case of using the occupancyMap, a method of reducing the resolution of the occupancyMap (reducing the accuracy) as compared with the resolution of the geometry video frame has been considered. By doing in this way, an information amount can be reduced, and encoding efficiency can also be improved.

For example, by setting the pixel accuracy of the occupancyMap to 4×4 pixel accuracy and indicating the presence or absence of a patch for each region 10 (4×4 pixels) in FIG. 1, it is possible to set the information amount of the occupancyMap to 1/16 of the case of 1×1 pixel accuracy. As described above, by setting an N value to 2 or more for the N×N pixel accuracy occupancyMap, encoding efficiency can be improved.

<Filtering of occupancyMap>

However, by reducing the resolution of the occupancyMap, a value indicating presence of a patch is set for a region in which even one point is present, and there has been a possibility that encoding efficiency is deteriorated.

For example, the pixel 11 indicated in black in FIG. 1 indicates a pixel in which only one or two points are present in one region 10 among pixels in which the points are present. For example, the number of pixels in which a point is present is 1 in each of a region 10-1 and a region 10-3, 7 in a region 10-2, 0 in a region 10-4, and 4 in a region 10-5. As described above, even if the number of points in each region 10 is different, values of the regions 10-1 to 10-3 and the region 10-5 are to be values (for example, "1") indicating presence of a patch in the occupancyMap. That is, a region having a large proportion in which no patch is present, such as the region 10-1 and the region 10-3, also has a value (for example, "1") indicating presence of the patch.

Therefore, there has been a possibility that the patch is extracted from the frame image to be larger than the actual patch at a time of decoding, a decrease may occur such as, for example, a point of another adjacent patch being included in the frame image, and an unintended point is generated when the 3D data is constructed. As a result, there has been a possibility that the subjective quality of the point cloud is deteriorated.

Therefore, for example, a method has been considered in which a value of a region having a small proportion of the number of points is set to a value (for example, "0") indicating absence of a patch by filtering the occupancyMap as described in Non Patent Document 7.

Figure 2:
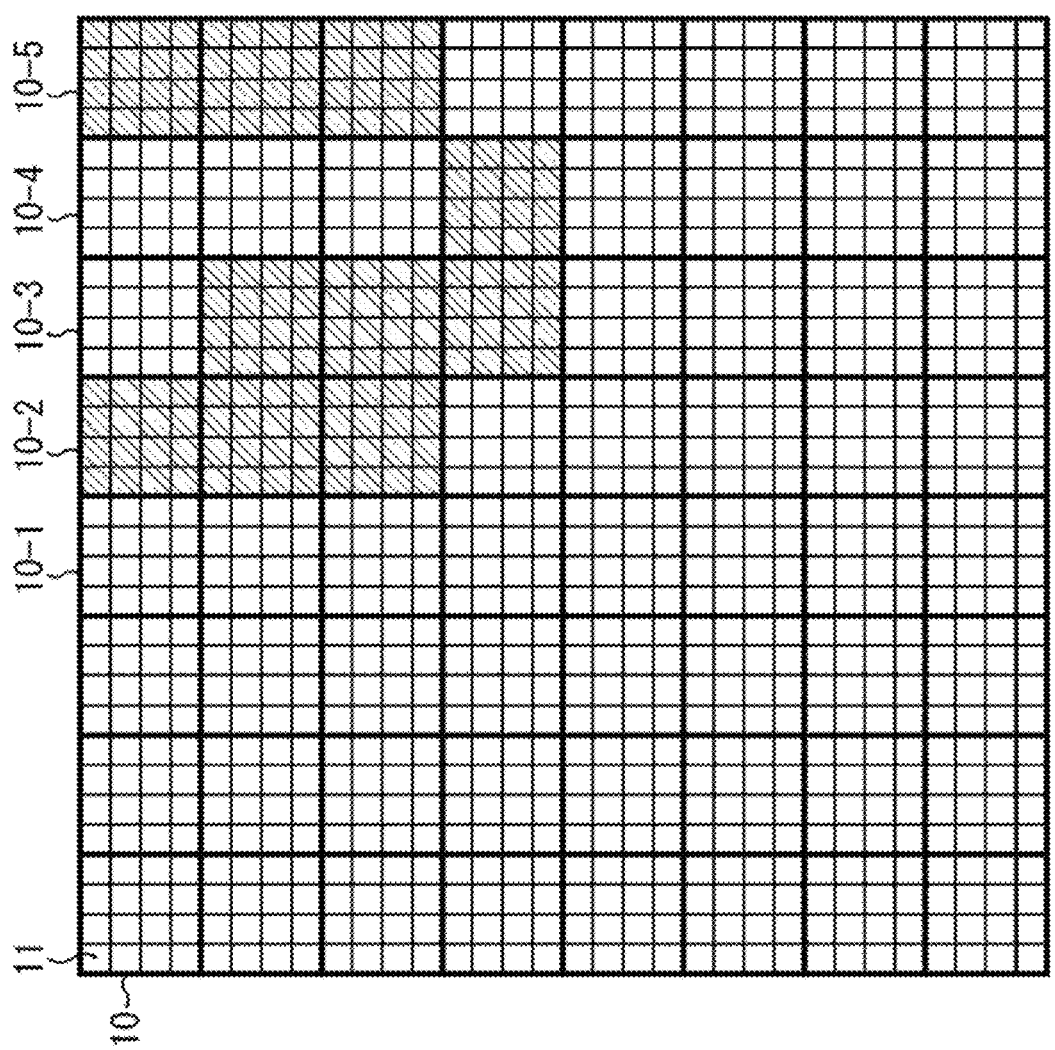
FIG. 2 is a view illustrating an example of a 4×4-accuracy occupancyMap after application of a fixed filter.

Non Patent Document 7 proposes a method of filtering an occupancyMap by using a predetermined filter (also referred to as a fixed filter). By performing filtering with such a fixed filter on the occupancyMap of FIG. 1, for example, an occupancyMap as illustrated in FIG. 2 is generated. In the occupancyMap illustrated in FIG. 2, the region 10 indicated by a diagonal line pattern indicates a region having a value (for example, "1") indicating presence of a patch, and the region 10 indicated in white indicates a region having a value (for example, "0") indicating absence of the patch.

In a case of this example, the fixed filter sets the value of the region 10 in which the number of pixels corresponding to the point is 2 pixels or less to a value (for example, "0") indicating absence of the patch. Therefore, the region 10 including the pixel 11 indicated in black in FIG. 1 is set to a value (for example, "0") indicating absence of the patch.

In other words, points corresponding to the pixels 11 indicated in black in FIG. 1 disappear due to this filtering. Therefore, there has been a possibility that points that are not originally desired to be dropped are dropped, and that the subjective quality of the point cloud is deteriorated. In particular, in a case of a dense and layered point cloud, disappearance of points may cause appearance in which a hole is generated, or appearance in which a hole is enlarged. Note that the point that disappears by the filtering is also referred to as a disappeared point. However, on a frame image, that is, in two dimensions, it has been difficult to consider a relationship between such a disappeared point and a point included in another patch.

<Consideration of Three-Dimensional Position Information>

Therefore, as in method 1 shown in the uppermost row of a table of FIG. 3, an occupancyMap corresponding to a position (3D position) of a point in a three-dimensional space is generated.

For example, in an information processing apparatus, there is provided a generation unit configured to generate an occupancyMap indicating, for each local area of a frame image, presence or absence of a projection image of a point cloud on a two-dimensional plane in accordance with a positional relationship of points in a three-dimensional space, the point cloud representing an object having a three-dimensional shape as a set of the points.

For example, as an information generation method, there is generated an occupancyMap indicating, for each local area of a frame image, presence or absence of a projection image of a point cloud on a two-dimensional plane in accordance with a positional relationship of points in a three-dimensional space, the point cloud representing an object having a three-dimensional shape as a set of the points.

By doing in this way, it is possible to generate an occupancyMap in consideration of overlapping of boundaries of a plurality of patches, and it is possible to suppress deterioration in subjective quality of a point cloud.

Furthermore, for example, as in method 1-1 shown in the second row from the top of the table in FIG. 3, in accordance with a positional relationship with a neighboring point in a three-dimensional space, it may be determined whether or not a point is a disappeared point, which is a point that disappears when a projection image is extracted from a frame image by using an occupancyMap, and a value of a local area of the occupancyMap may be set on the basis of the determination result. That is, the value of each local area of the occupancyMap may be set in accordance with whether or not the local area includes the disappeared point.

For example, a value of a local area including a point determined to be a disappeared point in the occupancyMap may be set to a value indicating presence of a projection image. That is, a value of the occupancyMap for a region where the point disappears may be set to a value indicating presence of a projection image.

By doing in this way, for example, the disappeared point can be determined in consideration of overlapping of boundaries of a plurality of patches. Thus, the occupancyMap can be generated so as to suppress an increase in the disappearance of points in a point cloud. Therefore, it is possible to suppress deterioration in subjective quality of the point cloud.

Furthermore, for example, for a local area including a point determined to be a disappeared point, it is possible to inhibit application of a filtering process of setting a value of the local area having a small proportion of the projection image of the occupancyMap to a value indicating absence of the projection image. That is, the filtering process may not be performed on the region including the point that becomes the disappeared point by performing the filtering process.

By doing in this way, for example, the disappeared point due to the filtering process can be determined in consideration of overlapping of boundaries of a plurality of patches. Therefore, the occupancyMap can be generated so as to suppress an increase in the disappearance of points due to the filtering process in the point cloud. Therefore, it is possible to suppress deterioration in subjective quality of the point cloud.

Moreover, for example, it may be determined whether or not the point is a disappeared point for each point of the local area for which a value indicating presence of the projection image is set in the occupancyMap not subjected to the filtering process, which is of setting a value of the local area having a small proportion of the projection image in the occupancyMap to a value indicating absence of the projection image while a value indicating absence of the projection image is set in the occupancyMap subjected to the filtering process.

For example, FIG. 4 illustrates an example of a comparison result of an occupancyMap before and after application of the filtering process with a conventional fixed filter. The example of FIG. 4 illustrates a comparison result between the 4×4 pixel accuracy occupancyMap of the example of FIG. 1 and the occupancyMap of the example of FIG. 2 in which the fixed filter is applied to the occupancyMap. In FIG. 4, the region 10 indicated in gray is a difference portion, that is, a region in which a value indicating absence of a patch is set by performing the filtering process. For example, in the regions 10-1 to 10-5, the regions 10-1 and 10-3 are illustrated in gray.

Points that disappear due to the filtering process may be present in this gray region 10. That is, the points in the gray region 10 may be candidates for the disappeared point due to the filtering process. Therefore, determination of the disappeared point may be performed for this gray region 10.

By doing in this way, it is possible to suppress an increase in a processing load as compared with a case of determining the disappeared point for all the regions 10.

Furthermore, for example, it may be determined whether or not the point is the disappeared point in accordance with a distance between a processing target point and a neighboring point thereof.

By doing in this way, it is possible to generate an occupancyMap on the basis of a distance between points, which makes it possible to generate an occupancyMap in consideration of overlapping of boundaries of a plurality of patches, and to suppress deterioration in subjective quality of a point cloud.

Furthermore, for example, as in method 1-1-1 shown in the third row from the top of the table in FIG. 3, filter control may be performed on the basis of whether a point is present within a distance r from the disappeared point due to the filtering, to generate the occupancyMap. For example, when a distance between a processing target point and a neighboring point thereof is equal to or less than a predetermined threshold value (for example, r), it may be determined that the point is not the disappeared point. In other words, when a distance between a processing target point and a neighboring point thereof is larger than the threshold value, the point may be determined as a disappeared point.

By doing in this way, it is possible to generate the occupancyMap such that points having no neighboring points do not disappear. Furthermore, a determination level of the presence or absence of a neighboring point can be controlled by a threshold value of a distance. Therefore, it is possible to suppress deterioration in subjective quality of the point cloud.

Furthermore, for example, as in method 1-1-1-1 shown in the fourth row from the top of the table in FIG. 3, filter control may be performed in accordance with a distance between a disappeared point and a neighboring point on the three-dimensional space, to generate the occupancyMap. For example, when it is determined that a distance between a processing target point and a neighboring point thereof in the three-dimensional space is equal to or less than a predetermined threshold value, it may be determined that the point is not a disappeared point. In other words, when a distance between a processing target point and a neighboring point thereof in the three-dimensional space is larger than the threshold value, the point may be determined as a disappeared point.

By doing in this way, it is possible to generate the occupancyMap such that points having no neighboring points do not disappear. Furthermore, a determination level of the presence or absence of a neighboring point can be controlled by a threshold value of a distance on the three-dimensional space. Therefore, it is possible to suppress deterioration in subjective quality of the point cloud.

Furthermore, for example, as in method 1-1-1-2 shown in the fifth row from the top of the table in FIG. 3, filter control may be performed in accordance with a distance between a disappeared point and a neighboring point on the projection plane, to generate the occupancyMap. For example, when it is determined that a distance between a processing target point and a neighboring point thereof on the projection plane is equal to or less than a predetermined threshold value, it may be determined that the point is not a disappeared point. In other words, when a distance between a processing target point and a neighboring point thereof on the projection plane is larger than the threshold value, the point may be determined as a disappeared point.

By doing in this way, it is possible to generate the occupancyMap such that points having no neighboring points do not disappear. Furthermore, a determination level of the presence or absence of a neighboring point can be controlled by a threshold value of a distance on the projection plane. Therefore, it is possible to suppress deterioration in subjective quality of the point cloud.

Furthermore, for example, as in method 1-1-1-3 shown in the sixth row from the top of the table in FIG. 3, filter control may be performed in accordance with a distance between a disappeared point and a neighboring point in a normal direction of the projection plane, to generate the occupancyMap. For example, when it is determined that a distance between a processing target point and a neighboring point thereof in the normal direction of the projection plane is equal to or less than a predetermined threshold value, it may be determined that the point is not a disappeared point. In other words, when a distance between a processing target point and a neighboring point thereof in the normal direction of the projection plane is larger than the threshold value, the point may be determined as a disappeared point.

By doing in this way, it is possible to generate the occupancyMap such that points having no neighboring points do not disappear. Furthermore, a determination level of the presence or absence of a neighboring point can be controlled by a threshold value of a distance in the normal direction of the projection plane. Therefore, it is possible to suppress deterioration in subjective quality of the point cloud.

Furthermore, for example, as in method 1-1-2 shown in the seventh row from the top of the table in FIG. 3, filter control may be performed in accordance with the number of points within the distance r from a disappeared point due to the filtering, to generate the occupancyMap. For example, when the number of points whose distance from a processing target point is equal to or less than a predetermined threshold value (for example, r) is equal to or more than a predetermined threshold value (for example, m), it may be determined that the point is not a disappeared point. In other words, when the number of points whose distance from a processing target point is equal to or less than the threshold value (for example, r) is less than the threshold value (for example, m), the point may be determined as a disappeared point.

By doing in this way, it is possible to generate the occupancyMap such that points having a small number of neighboring points do not disappear. Furthermore, a determination level of the disappeared point can be controlled by the threshold value of the distance and the threshold value of the number of points. Therefore, it is possible to suppress deterioration in subjective quality of the point cloud.

Furthermore, for example, as in method 1-1-3 shown in the eighth row from the top of the table in FIG. 3, a filtering condition may be controlled in accordance with a position of a disappeared point due to filtering, to generate the occupancyMap. For example, a filtering condition applied to a region near a boundary of the patch and a filtering condition applied to a region inside the patch may have contents different from each other. For example, filtering may be applied to a region near a boundary of the patch only when a point of another patch is present at the same position as the point of the region, and filtering may be applied to a region inside the patch (a region that is not near the boundary of the patch) if a point is present near the point of the region. That is, for example, whether or not to be the disappeared point may be determined using a threshold value corresponding to a position of the point.

By doing in this way, it is possible to determine whether or not the point is the disappeared point by using a condition according to the position of the processing target point. That is, the determination level of the disappeared point can be controlled in accordance with the position of the point. Therefore, it is possible to generate the occupancyMap with more appropriate accuracy such that the disappeared point does not increase, and it is possible to suppress deterioration in subjective quality of the point cloud.

Furthermore, for example, as in method 1-2 shown in the ninth row from the top of the table in FIG. 3, unpacking may be performed to extract a patch from a frame image by using an occupancyMap before and after application of filtering, coordinates of each point of the extracted patch may be converted from two-dimensional coordinates to three-dimensional coordinates, and a reconfiguration process for generating a point cloud may be performed. For example, it is possible to extract a projection image from a frame image by using each of an occupancyMap not subjected to the filtering process and an occupancyMap subjected to the filtering process, convert two-dimensional coordinates of each point included in the extracted projection image into three-dimensional coordinates, compares three-dimensional coordinates of each point included in the projection image extracted using the occupancyMap not subjected to the filtering process with three-dimensional coordinates of each point included in the projection image extracted using the occupancyMap subjected to the filtering process, to detect a local area in which a value indicating presence of the projection image is set in the occupancyMap not subjected to the filtering process while a value indicating absence of the projection image is set in the occupancyMap subjected to the filtering process, and determine whether or not each point of the detected local is a disappeared point.

By doing in this way, it is possible to generate an occupancyMap in consideration of overlapping of boundaries of a plurality of patches by using the packed data, and it is possible to suppress deterioration in subjective quality of a point cloud.

In this case, for example, as in method 1-2-1 shown in the tenth row from the top of the table in FIG. 3, a position of the point may be corrected by performing a smoothing process on a point cloud derived by the reconfiguration process. By doing in this way, it is possible to suppress an increase in a frequency of occurrence of a positional deviation and a deviation amount of the points due to encoding and decoding, and it is possible to suppress deterioration in subjective quality of the point cloud.

Of course, as in method 1-2-2 shown in the eleventh row from the top of the table in FIG. 3, the smoothing process (smoothing) may not be performed on the point cloud derived by the reconfiguration process.

Note that, for example, the filtering process with the fixed filter may be performed on the occupancyMap. Then, it is possible to extract a projection image from a frame image by using the occupancyMap not subjected to the filtering process, convert two-dimensional coordinates of each point included in the extracted projection image into three-dimensional coordinates, further extract a projection image from a frame image by using the occupancyMap subjected to the filtering process, and convert two-dimensional coordinates of each point included in the extracted projection image into three-dimensional coordinates.

By doing in this way, it is possible to perform a filtering process using a conventional fixed filter on the occupancyMap to generate the occupancyMap in consideration of overlapping of boundaries of a plurality of patches, and it is possible to suppress deterioration in subjective quality of the point cloud.

Furthermore, for example, the local area can have lower accuracy than the resolution of the points. That is, pixel accuracy of the occupancyMap may be lower accuracy than 1×1 pixel. For example, the local area may have 4×4 accuracy of the resolution of the points. That is, the pixel accuracy of the occupancyMap may be 4×4 pixel accuracy. By doing in this way, it is possible to suppress an increase in an information amount of the occupancyMap and to suppress deterioration in encoding efficiency.

Moreover, for example, a moving image including a frame image and including an occupancyMap that is generated as described above and is in consideration of overlapping of boundaries of a plurality of patches may be encoded, to generate encoded data of the occupancyMap.

Furthermore, for example, a moving image including a frame image in which a projection image of geometry data of a point cloud is arranged may be encoded, to generate encoded data of the geometry data. A moving image including a frame image in which a projection image of attribute data of a point cloud is arranged may be encoded, to generate encoded data of the attribute data.

Moreover, for example, the encoded data of the occupancyMap, the encoded data of the geometry data, and the encoded data of the attribute data may be multiplexed.

By doing in this way, it is possible to suppress an increase in an information amount at a time of transmitting or recording the point cloud data.

Furthermore, for example, in an information processing apparatus, there are provided: an extraction unit configured to extract a projection image of geometry data and a projection image of attribute data of a point cloud from a frame image by using an occupancyMap that is generated in accordance with a positional relationship of points in a three-dimensional space of the point cloud representing an object having a three-dimensional shape as a set of the points, the occupancyMap indicating, for each local area of a frame image, presence or absence of a projection image of the point cloud on a two-dimensional plane; and a generation unit configured to generate the point cloud by using the projection image of the geometry data and the projection image of the attribute data that have been extracted by the extraction unit.

For example, as an information generation method, a projection image of geometry data and a projection image of attribute data of a point cloud are extracted from a frame image by using an occupancyMap that is generated in accordance with a positional relationship of points in a three-dimensional space of the point cloud representing an object having a three-dimensional shape as a set of the points, the occupancyMap indicating, for each local area of a frame image, presence or absence of a projection image of the point cloud on a two-dimensional plane, and the point cloud is generated by using the projection image of the geometry data and the projection image of the attribute data that have been extracted.

By doing in this way, unpacking can be performed using an occupancyMap filtered in consideration of overlapping of boundaries of a plurality of patches. Therefore, it is possible to suppress deterioration in subjective quality of the point cloud.

2. FIRST EMBODIMENT

<Encoding Device>

Figure 5:
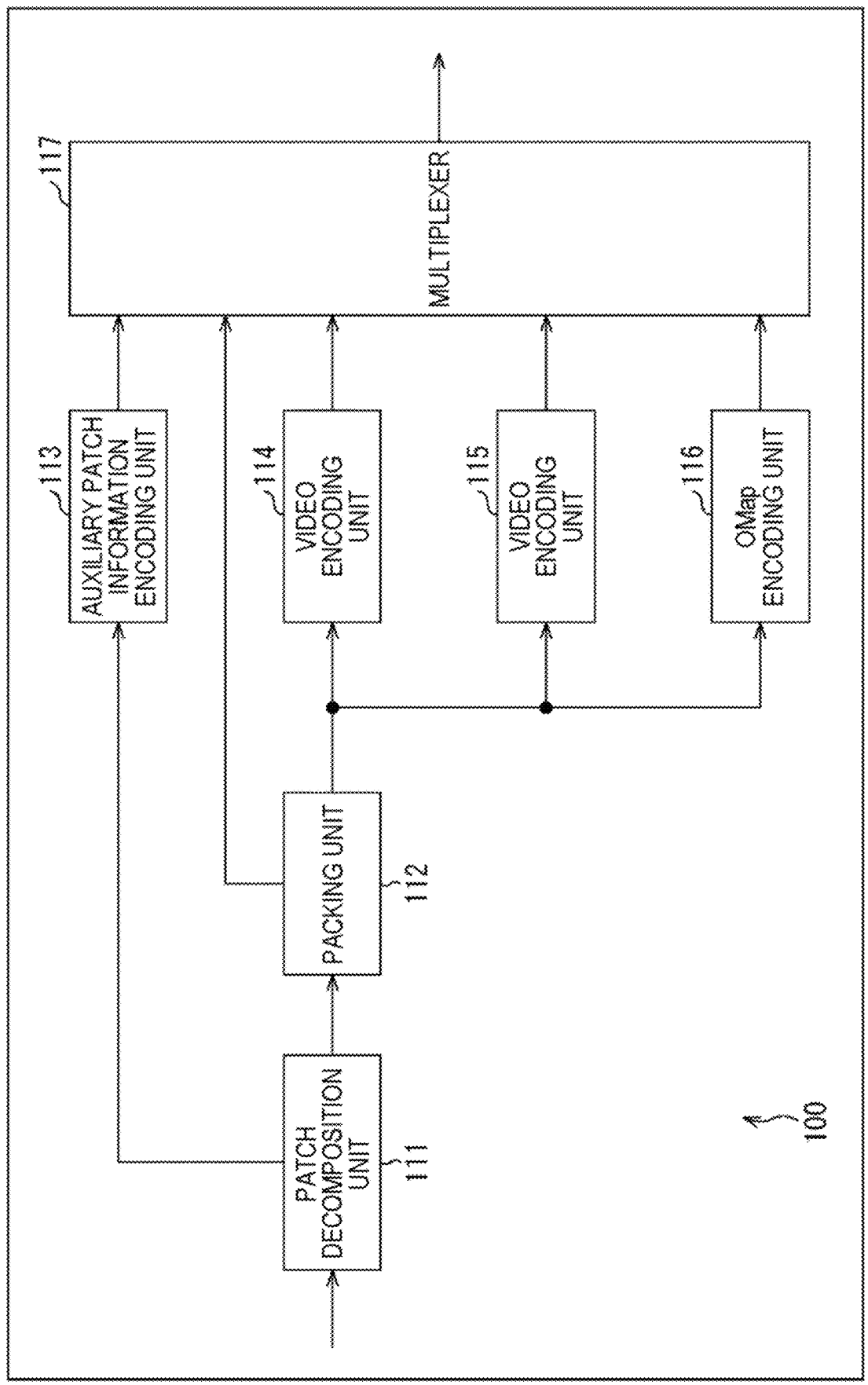
FIG. 5 is a block diagram illustrating a main configuration example of an encoding device.

FIG. 5 is a block diagram illustrating an example of a configuration of an encoding device, which is one mode of an image processing apparatus to which the present technology is applied. An encoding device 100 illustrated in FIG. 5 is a device (encoding device to which a video-based approach is applied) that projects 3D data such as a point cloud onto a two-dimensional plane and performs encoding by an encoding method for a two-dimensional image.

Note that, in FIG. 5, main parts of processing units, data flows, and the like are illustrated, and those illustrated in FIG. 5 are not necessarily all. That is, in the encoding device 100, there may be a processing unit not illustrated as a block in FIG. 5, or there may be a flow of processing or data not illustrated as an arrow or the like in FIG. 5. This similarly applies to other drawings describing processing units and the like in the encoding device 100.

As illustrated in FIG. 5, the encoding device 100 may include a patch decomposition unit 111, a packing unit 112, an auxiliary patch information encoding unit 113, a video encoding unit 114, a video encoding unit 115, an OMap encoding unit 116, and a multiplexer 117.

The patch decomposition unit 111 performs processing related to decomposition of 3D data. For example, the patch decomposition unit 111 may acquire 3D data (for example, a point cloud) representing a three-dimensional structure to be inputted to the encoding device 100. Furthermore, the patch decomposition unit 111 may decompose the acquired 3D data into a plurality of small regions (also referred to as connection components), and project the 3D data onto a projection plane that is a two-dimensional plane for each small region, to generate a patch of position information or a patch of attribute information.

The patch decomposition unit 111 may supply information regarding the generated each patch to the packing unit 112. Furthermore, the patch decomposition unit 111 may supply auxiliary patch information, which is information regarding the decomposition, to the auxiliary patch information encoding unit 113.

The packing unit 112 performs processing related to data packing. For example, the packing unit 112 may acquire information regarding a patch supplied from the patch decomposition unit 111. Furthermore, the packing unit 112 may arrange the acquired each patch in a two-dimensional image, and perform packing as a video frame. For example, the packing unit 112 may pack patches of geometry data as a video frame to generate geometry video frame(s). Furthermore, the packing unit 112 may pack patches of attribute data as a video frame to generate a color video frame(s). Moreover, the packing unit 112 may generate an occupancyMap indicating the presence or absence of a patch.

The packing unit 112 supplies these to a processing unit in a subsequent stage. For example, the packing unit 112 may supply the geometry video frame to the video encoding unit 114 and the OMap encoding unit 116, supply the color video frame to the video encoding unit 115, and supply the occupancyMap to the OMap encoding unit 116. This occupancyMap may have lower accuracy than the resolution of the points. Furthermore, the packing unit 112 may supply control information regarding the packing to the multiplexer 117.

The auxiliary patch information encoding unit 113 performs processing related to encoding of auxiliary patch information. For example, the auxiliary patch information encoding unit 113 may acquire auxiliary patch information supplied from the patch decomposition unit 111. Furthermore, the auxiliary patch information encoding unit 113 may encode the acquired auxiliary patch information, to generate encoded data of the auxiliary patch information. The auxiliary patch information encoding unit 113 may supply the generated encoded data of the auxiliary patch information to the multiplexer 117.

The video encoding unit 114 performs processing related to encoding of a geometry video frame. For example, the video encoding unit 114 may acquire a geometry video frame supplied from the packing unit 112. Furthermore, the video encoding unit 114 may encode the acquired geometry video frame by any encoding method for a two-dimensional image, such as AVC or HEVC, for example, to generate encoded data of the geometry video frame. The video encoding unit 114 may supply the generated encoded data of the geometry video frame to the multiplexer 117.

The video encoding unit 115 performs processing related to encoding of a color video frame. For example, the video encoding unit 115 may acquire a color video frame supplied from the packing unit 112. Furthermore, the video encoding unit 115 may encode the acquired color video frame by any encoding method for a two-dimensional image, such as AVC or HEVC, for example, to generate encoded data of the color video frame.

Note that the video encoding unit 114 may decode the encoded data of the geometry video frame, and supply the generated (restored) geometry video frame to the video encoding unit 115. Then, the video encoding unit 115 may acquire the geometry video frame, recolor the color video frame by using the acquired geometry video frame, and associate the attribute data with the geometry data. That is, the video encoding unit 115 can associate the attribute data with the geometry data updated by the smoothing process in the encoding. In that case, the video encoding unit 115 can encode the recolored color video frame by any encoding method for a two-dimensional image, such as AVC or HEVC, for example, to generate encoded data of the color video frame.

Moreover, the video encoding unit 115 may supply the encoded data of the color video frame generated as described above to the multiplexer 117.

The OMap encoding unit 116 performs processing related to encoding of a video frame of an occupancyMap. For example, the OMap encoding unit 116 may acquire an occupancyMap and a geometry video frame supplied from the packing unit 112.

Furthermore, the OMap encoding unit 116 encodes the acquired occupancyMap by any encoding method such as, for example, arithmetic encoding, to generate encoded data of the occupancyMap. At that time, by updating the occupancyMap by using the geometry video frame, the OMap encoding unit 116 generates an occupancyMap according to a positional relationship of the points in the three-dimensional space. By doing in this way, the OMap encoding unit 116 can generate an occupancyMap in consideration of overlapping of boundaries of a plurality of patches, and it is possible to suppress deterioration in subjective quality of a point cloud.

Moreover, the OMap encoding unit 116 may supply the generated encoded data of the occupancyMap to the multiplexer 117.

The multiplexer 117 performs processing related to multiplexing. For example, the multiplexer 117 may acquire encoded data of auxiliary patch information supplied from the auxiliary patch information encoding unit 113. Furthermore, the multiplexer 117 may acquire control information regarding packing supplied from the packing unit 112. Moreover, the multiplexer 117 may acquire encoded data of a geometry video frame supplied from the video encoding unit 114. Furthermore, the multiplexer 117 may acquire encoded data of a color video frame supplied from the video encoding unit 115. Moreover, the multiplexer 117 may acquire encoded data of an occupancyMap supplied from the OMap encoding unit 116. Furthermore, the multiplexer 117 may multiplex the acquired information to generate a bitstream. Moreover, the multiplexer 117 may output the generated bitstream to the outside of the encoding device 100.

Note that these processing units (the patch decomposition unit 111 to the multiplexer 117) have any configuration. For example, each processing unit may be configured by a logic circuit that implements the above-described processing. Furthermore, each processing unit may have, for example, a central processing unit (CPU), a read only memory (ROM), a random access memory (RAM), and the like, and execute a program by using them to implement the above-described processing. Of course, each processing unit may have both of the configurations, implement a part of the above-described processing by the logic circuit, and implement other by executing the program. The configurations of the processing units may be independent from each other and, for example, some processing units may implement a part of the above-described processing by the logic circuit, some other processing units may implement the above-described processing by executing the program, and still some other processing units may implement the above-described processing by both the logic circuit and the execution of the program.

<OMap Encoding Unit>

Figure 6:
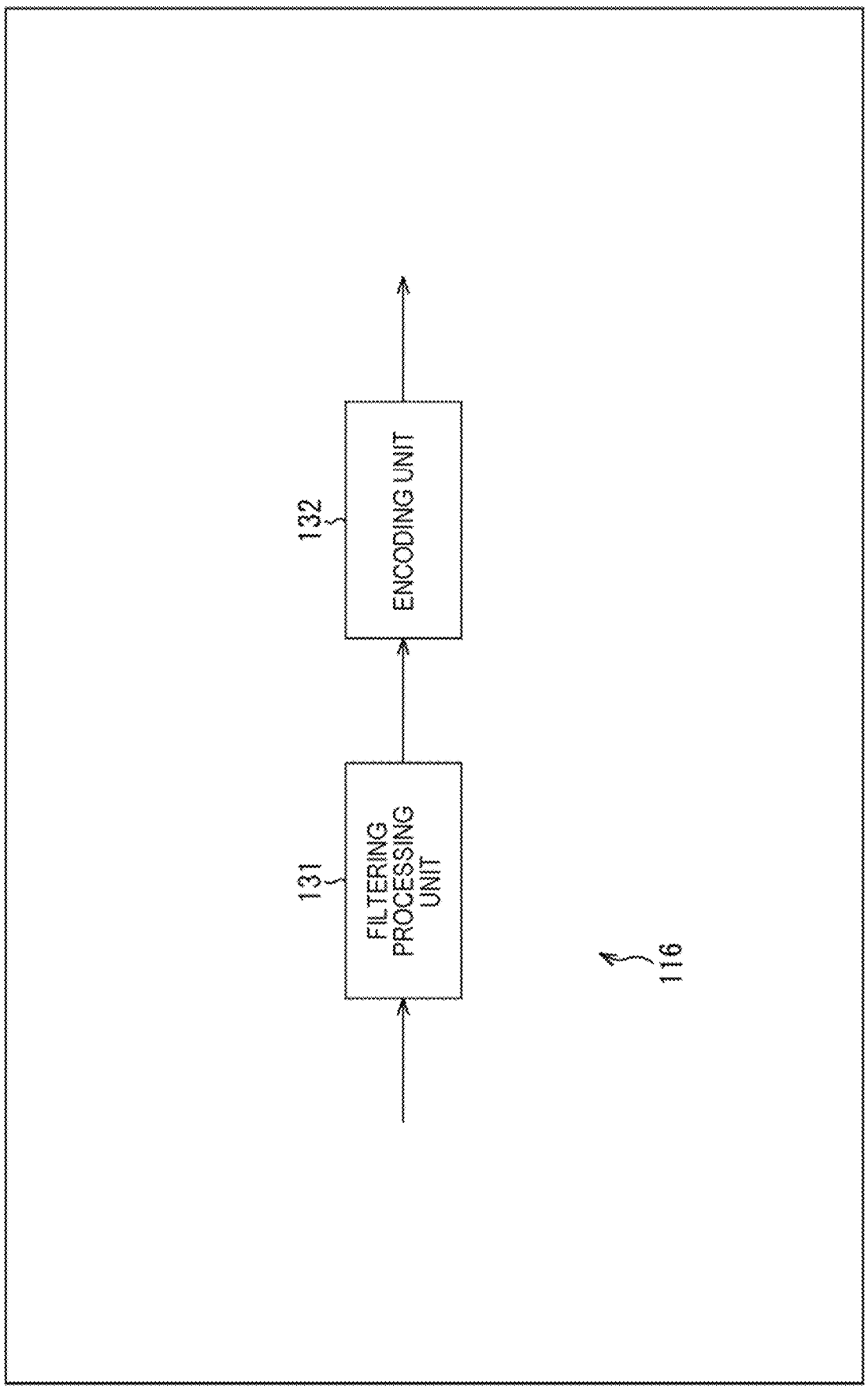
FIG. 6 is a block diagram illustrating a main configuration example of an OMap encoding unit.

FIG. 6 is a block diagram illustrating a main configuration example of the OMap encoding unit 116. As illustrated in FIG. 6, the OMap encoding unit 116 includes a filtering processing unit 131 and an encoding unit 132.

The filtering processing unit 131 performs processing related to filtering of an occupancyMap. For example, the filtering processing unit 131 may acquire an occupancyMap and a geometry video frame supplied from the packing unit 112.

Furthermore, the filtering processing unit 131 performs filtering (the filtering process) on the acquired occupancyMap such that a value of a region having a small proportion of points (patches) is a value (for example, "0") indicating absence of a patch. At that time, the filtering processing unit 131 performs filtering on the basis of a position (3D position) of the point in the three-dimensional space by using the acquired geometry data. That is, the filtering processing unit 131 generates an occupancyMap according to the 3D position of the point. By generating the occupancyMap in consideration of the 3D position of the point in this way, the filtering processing unit 131 can generate an occupancyMap in consideration of overlapping of boundaries of a plurality of patches, and can suppress deterioration in subjective quality of a point cloud.

Moreover, the filtering processing unit 131 may supply the generated occupancyMap (occupancyMap subjected to the filtering process) to the encoding unit 132.

The encoding unit 132 performs processing related to encoding of an occupancyMap. For example, the encoding unit 132 may acquire an occupancyMap supplied from the filtering processing unit 131. Furthermore, the encoding unit 132 may encode the acquired occupancyMap by any encoding method such as, for example, arithmetic encoding, to generate encoded data of the occupancyMap. Moreover, the encoding unit 132 may supply the generated encoded data of the occupancyMap to the multiplexer 117.

<Filtering Processing Unit>

Figure 7:
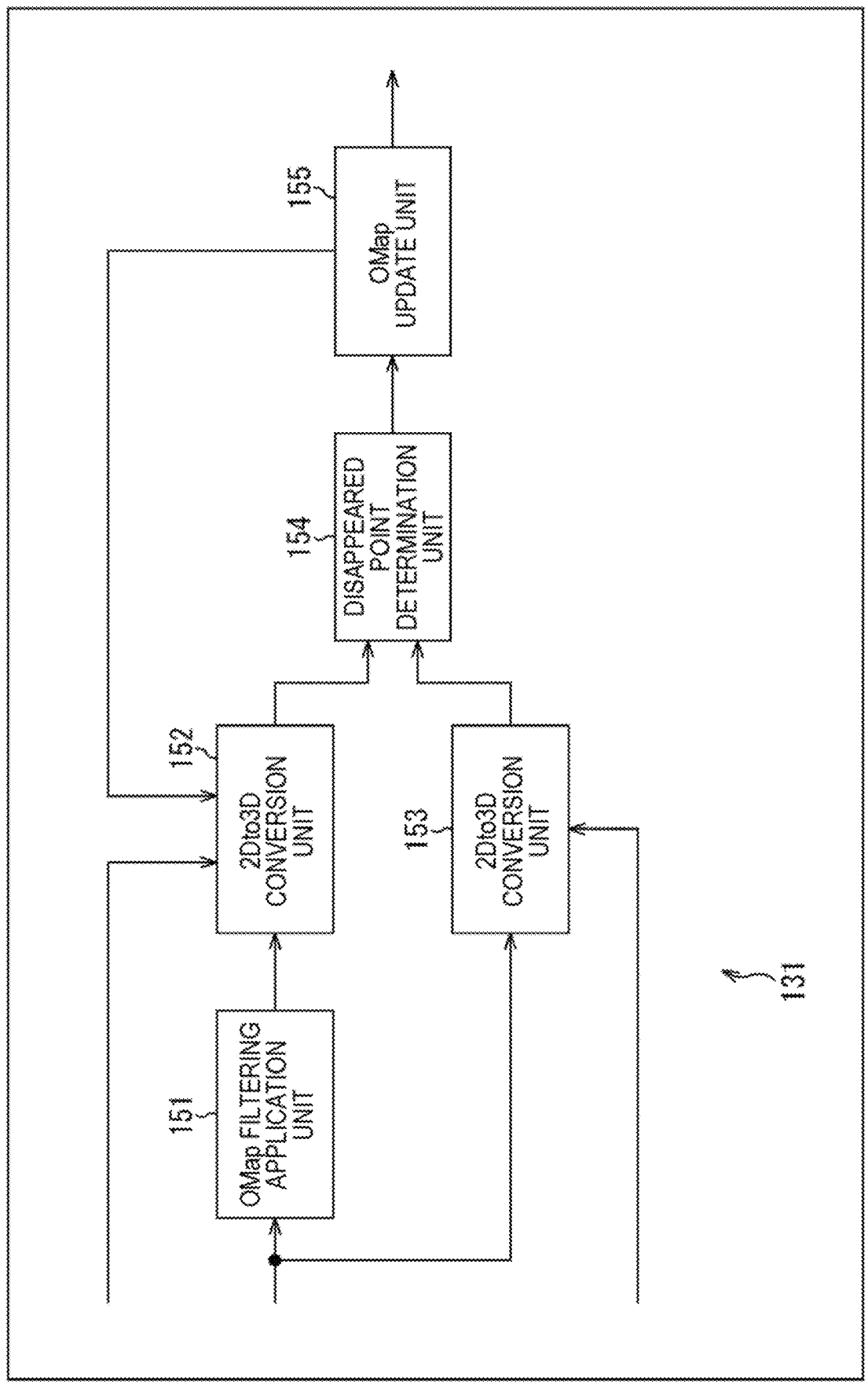
FIG. 7 is a block diagram illustrating a main configuration example of a filtering processing unit.

FIG. 7 is a block diagram illustrating a main configuration example of the filtering processing unit 131. As illustrated in FIG. 7, the filtering processing unit 131 includes an OMap filtering application unit 151, a 2D to 3D conversion unit 152, a 2D to 3D conversion unit 153, a disappeared point determination unit 154, and an OMap update unit 155.

The OMap filtering application unit 151 performs processing related to the filtering process on an occupancyMap. For example, the OMap filtering application unit 151 may acquire an occupancyMap supplied from the packing unit 112. Furthermore, the OMap filtering application unit 151 may perform the filtering process using the fixed filter on the acquired occupancyMap. This processing is performed, for example, similarly to the method described in Non Patent Document 7. That is, by this filtering process, a value of a region in which a proportion of patches is smaller than a predetermined threshold value in the occupancyMap is updated (set) to the "value indicating absence of a patch". For example, by performing this filtering process on an occupancyMap of 4×4 pixel accuracy as illustrated in FIG. 1, an occupancyMap of 4×4 pixel accuracy is generated as illustrated in FIG. 2, that is, the occupancyMap in which a value of the region 10 in which the number of pixels corresponding to the point is 2 or less is set to "the value indicating absence of a patch". Moreover, the OMap filtering application unit 151 may supply such an occupancyMap subjected to the filtering process to the 2D to 3D conversion unit 152.

The 2D to 3D conversion unit 152 performs processing related to conversion of geometry data of points from two-dimensional coordinates to three-dimensional coordinates. For example, the 2D to 3D conversion unit 152 may acquire an occupancyMap subjected to the filtering process and supplied from the OMap filtering application unit 151. Furthermore, the 2D to 3D conversion unit 152 may acquire an updated occupancyMap supplied from the OMap update unit 155. Moreover, the 2D to 3D conversion unit 152 may acquire a geometry video frame supplied from the packing unit 112. Furthermore, the 2D to 3D conversion unit 152 may extract a patch from the geometry video frame by using the occupancyMap subjected to the filtering process or the updated occupancyMap, and convert two-dimensional coordinates (for example, (x, y)) of points included in each patch into three-dimensional coordinates (for example, (x, y, z)). Any method may be adopted for the patch extraction method and the coordinate system conversion method. For example, the 2D to 3D conversion unit 152 may extract, as a patch, a region in which a patch is assumed to be present in the occupancyMap, from the geometry video frame. Furthermore, the 2D to 3D conversion unit 152 may convert two-dimensional coordinates into three-dimensional coordinates (x, y, z) by adding a pixel value to the coordinates (two-dimensional coordinates (x, y)) on the geometry video frame of the points included in the extracted patch.

At that time, the 2D to 3D conversion unit 152 may perform the smoothing process on a point group of the converted three-dimensional coordinates, that is, the geometry data of the point cloud. By doing in this way, it is possible to suppress an increase in a frequency of occurrence of a positional deviation and a deviation amount of the points due to encoding and decoding. Note that, of course, the smoothing process may not be performed.

Moreover, the 2D to 3D conversion unit 152 may supply the occupancyMap subjected to the filtering process to the disappeared point determination unit 154. Furthermore, the 2D to 3D conversion unit 152 may also supply the disappeared point determination unit 154 with geometry data of a point group of the converted three-dimensional coordinates, that is, the point cloud corresponding to the occupancyMap subjected to the filtering process.

The 2D to 3D conversion unit 153 performs processing related to conversion of geometry data of points from two-dimensional coordinates to three-dimensional coordinates. For example, the 2D to 3D conversion unit 153 may acquire an occupancyMap and a geometry video frame supplied from the packing unit 112. Furthermore, the 2D to 3D conversion unit 152 may extract a patch from the geometry video frame by using the occupancyMap, that is, the occupancyMap not subjected to the filtering process, and convert two-dimensional coordinates (for example, (x, y)) of points included in each patch into three-dimensional coordinates (for example, (x, y, z)). The patch extraction method and the coordinate system conversion method are similar to the case of the 2D to 3D conversion unit 152.

At that time, the 2D to 3D conversion unit 153 may perform the smoothing process on a point group of the converted three-dimensional coordinates, that is, the geometry data of the point cloud. By doing in this way, it is possible to suppress an increase in a frequency of occurrence of a positional deviation and a deviation amount of the points due to encoding and decoding. Note that, of course, the smoothing process may not be performed.

Moreover, the 2D to 3D conversion unit 153 may supply the occupancyMap not subjected to the filtering process to the disappeared point determination unit 154. Furthermore, the 2D to 3D conversion unit 153 may also supply the disappeared point determination unit 154 with geometry data of a point group of the converted three-dimensional coordinates, that is, the point cloud corresponding to the occupancyMap not subjected to the filtering process.

The disappeared point determination unit 154 performs processing related to determination of a disappeared point. For example, the disappeared point determination unit 154 may acquire an occupancyMap that is subjected to the filtering process and supplied from the 2D to 3D conversion unit 152. Furthermore, the disappeared point determination unit 154 may acquire geometry data of a point cloud corresponding to the occupancyMap subjected to the filtering process and supplied from the 2D to 3D conversion unit 152. Moreover, the disappeared point determination unit 154 may acquire an occupancyMap that is not subjected to the filtering process and is supplied from the 2D to 3D conversion unit 153. Furthermore, the disappeared point determination unit 154 may acquire geometry data of a point cloud corresponding to an occupancyMap that is not subjected to the filtering process and is supplied from the 2D to 3D conversion unit 153.

Furthermore, the disappeared point determination unit 154 may obtain a disappeared point that disappears when a patch is extracted from a geometry video frame, by using the acquired information. For example, the disappeared point determination unit 154 may determine whether or not a processing target point is a disappeared point in accordance with a positional relationship between the processing target point and a neighboring point of the processing target point in a three-dimensional space. For example, even if the processing target point disappears, when a point is present in the vicinity, the point is substituted for the processing target point, and an influence on the quality of the point cloud is reduced. That is, such a point is considered not to be substantially lost as a point cloud, and it can be said that such a point is not a disappeared point. Conversely, when there is no other point to be substituted for the processing target point, an influence on quality of the point cloud due to the disappearance of the processing target point increases. In such a case, it can be said that the processing target point is the disappeared point. The positional relationship between points can be obtained by using geometry data, for example, geometry data of a point cloud corresponding to an occupancyMap that is not subjected to the filtering process and is supplied from the 2D to 3D conversion unit 153.

By doing in this way, the disappeared point determination unit 154 can determine whether or not to be a disappeared point on the basis of, for example, a positional relationship between points in a three-dimensional space. That is, the disappeared point can be determined in consideration of overlapping of boundaries of a plurality of patches. Thus, the occupancyMap can be generated so as to suppress an increase in the disappearance of points in a point cloud. Therefore, it is possible to suppress deterioration in subjective quality of the point cloud.

For example, the disappeared point determination unit 154 may determine whether or not the point is a disappeared point in accordance with a distance between a processing target point and a neighboring point thereof. That is, the disappeared point determination unit 154 may determine whether or not to be a disappeared point depending on how far the neighboring point is away from the processing target point.

For example, when a distance between the processing target point and the neighboring point thereof is equal to or less than a predetermined threshold value, the disappeared point determination unit 154 may determine that the processing measure point is not a disappeared point. That is, when the neighboring point is located sufficiently close to the processing target point, the disappeared point determination unit 154 can determine that the neighboring point may substitute for the processing target point, and can determine that the processing target point is not the disappeared point. Conversely, when the neighboring point is away from the processing target point by a certain degree or more, the disappeared point determination unit 154 can determine that the neighboring point cannot substitute for the processing target point, and can determine that the processing target point is a disappeared point.

This distance may be, for example, a distance in a three-dimensional space. For example, this distance may be a distance on the projection plane. Moreover, for example, this distance may be a distance in a normal direction of the projection plane.

Furthermore, in the determination of the disappeared point, the number of neighboring points may also be considered in addition to the distance to the neighboring point. For example, when the number of points whose distance from the processing target point is equal to or less than a predetermined threshold value is equal to or more than a predetermined threshold value, the disappeared point determination unit 154 may determine that the point is not a disappeared point. That is, for example, the processing target point may be determined not to be the disappeared point only when a plurality of points is present at a sufficiently close distance to the processing target point.

Furthermore, for example, the threshold value of the number of points may be changed in accordance with the distance from the processing target point. For example, if one or more points are present at the same position as the processing target point, it may be determined that the processing target point can be substituted and the processing target point is not the disappeared point. On the other hand, when the point is not at the same position as the processing target point (when the point is within a predetermined range in the vicinity), only when there is a plurality of points, it may be determined that the processing target point can be substituted and the processing target point is not the disappeared point. In this manner, more points may be required to determine that the processing target point is not the disappeared point, as the processing target point is farther from the processing target point.

Furthermore, a plurality of such conditions may be applied. That is, for each of the plurality of distances, it is possible to set a threshold value of the number of points at which it can be determined that the processing target point is not the disappeared point. For example, as described above, in order to determine that the processing target point is not a disappeared point, the number of neighboring points according to the distance may be required, such as one piece in a case of a distance of zero, two pieces for a small distance, and three pieces for a further distance.

By doing in this way, it is possible to determine a disappeared point under a condition further corresponding to a configuration on a three-dimensional space, to generate an occupancyMap. Therefore, it is possible to suppress deterioration in subjective quality of the point cloud.

Moreover, for example, the disappeared point determination unit 154 may determine whether or not to be a disappeared point by using a threshold value corresponding to a position of the processing target point. That is, the above-described threshold values of the distance and the number may be variable in accordance with the position of the processing target point. For example, for points inside the patch (not near the boundary), the determination of the disappeared point may be performed under relatively severe conditions (conditions under which it is more difficult to determine as a disappeared point, for example, the distance threshold value is relatively large, the number threshold value is relatively small, and the like). Whereas, for points near the boundary of the patch, the determination of the disappeared point may be performed under relatively loose conditions (conditions under which it is likely to be determined as a disappeared point, for example, the distance threshold value is relatively small and the number threshold value is relatively large).

By doing in this way, it is possible to determine the disappeared point under the condition more corresponding to the configuration of the point cloud, to generate an occupancyMap. Therefore, it is possible to suppress deterioration in subjective quality of the point cloud.

Furthermore, the condition for determining the disappeared point may be other than the distance and the number described above. For example, a direction (orientation) may also be included in the condition. That is, for example, the conditions of the distance and the number may not be uniform in all directions (orientations) from the processing target point, and these conditions may be uneven depending on the direction (orientation). For example, for a certain direction, it may be determined as the disappeared point when there are not more and closer points than other directions. Furthermore, the opposite may also be applied.

Furthermore, any other information may be considered in the determination of the disappeared point. For example, texture (attribute data) of a point cloud may be considered. For example, the condition for the determination of the disappeared point (for example, the threshold values of the distance and the number, or the like) may be controlled in accordance with a color, a pattern, or the like. For example, when a point of a stripe-shaped pattern portion is the processing target, when there are fewer and farther points in a longitudinal direction of the pattern than in other directions, it may not be determined as the disappeared point. Furthermore, the opposite may also be applied.

In the determination of the disappeared point as described above, for example, the disappeared point determination unit 154 may determine whether or not the point is the disappeared point for each point of a region in which a value indicating presence of a patch is set in the occupancyMap not subjected to the filtering process (that is, the filtering process using the fixed filter), which is of setting a value of a region having a small proportion of patches in the occupancyMap to a value indicating absence of a patch, while a value indicating absence of a patch is set in the occupancyMap subjected to the filtering process. That is, the disappeared point determination unit 154 may compare the occupancyMap supplied from the 2D to 3D conversion unit 152 with the occupancyMap supplied from the 2D to 3D conversion unit 153, and may perform the above-described determination of the disappeared point only for a region having mutually different values, that is, a region in which a value indicating absence of a patch is set by the filtering process using the fixed filter.

The disappeared point is generated by applying the filtering process using the fixed filter to the occupancyMap. That is, a patch extracted using the occupancyMap not subjected to the filtering process includes all the points that can be restored in the point cloud, and the disappeared point is present only in a region whose value has changed by this filtering process, that is, a region updated from a value indicating presence of a patch to a value indicating absence of a patch. Therefore, the above-described determination of the disappeared point is only required to be performed only for points in such a region. By doing in this way, it is possible to suppress an increase in a load of processing related to the determination of the disappeared point, as compared with a case of performing the processing on all the regions.

For example, it is assumed that the occupancyMap (4×4 pixel accuracy occupancyMap) for each region 10 in FIG. 1 is supplied from the 2D to 3D conversion unit 153. On the other hand, it is assumed that, from the 2D to 3D conversion unit 152, the occupancyMap as illustrated in FIG. 2 (the 4×4 pixel accuracy occupancyMap subjected to the filtering process using the fixed filter) is supplied. When comparing these occupancyMaps, as illustrated in FIG. 4, the gray regions 10 (regions 10 having different values) are detected as a difference. For the gray regions 10, the disappeared point determination unit 154 performs the determination of the disappeared point as described above.

For example, the difference region 10 (gray region 10) is defined as B, and a point in the region is defined as b. Furthermore, a region 10 having a value indicating presence of a patch of the occupancyMap subjected to the filtering process using the fixed filter is defined as C. A threshold value, which is used to determine whether or not to be a disappeared point, of a distance from a processing target point is defined as r, and a threshold value of the number of points is defined as m. Then, a disappeared point is determined on the basis of whether or not the following equation is satisfied.

true or false=f(b, C, r, m, dist_mode)

The function f( ) returns true (for example, "1") when m pieces of point of C are present in a range of the distance r or less from the point b, and returns false (for example, "0") in other cases. For example, when r=0 and m=1, true is returned when one or more points are present at the same position as the point b.

Note that, when there is a plurality of points in the region B that is a processing target, determination using the function f( ) may be performed for each point, and a determination result of the region B may be derived on the basis of a statistical value. For example, one having a larger number among true and false may be the determination result of the region B. Furthermore, at a time of such statistical value deriving, the determination result may be weighted for each point. For example, such weighting may be performed on the basis of a position of a point, attribute data, or the like.

The disappeared point determination unit 154 may supply the above-described determination result of the disappeared point to the OMap update unit 155. Furthermore, the disappeared point determination unit 154 may supply the occupancyMap subjected to the filtering process, that is, the occupancyMap supplied from the 2D to 3D conversion unit 152, to the OMap update unit 155.

The OMap update unit 155 performs processing related to update of an occupancyMap. For example, the OMap update unit 155 may acquire a determination result of the disappeared point and an occupancyMap supplied from the disappeared point determination unit 154. Furthermore, the OMap update unit 155 may update the acquired occupancyMap on the basis of the acquired determination result. That is, the OMap update unit 155 can generate an occupancyMap in accordance with a positional relationship of points in a three-dimensional space.

For example, the OMap update unit 155 sets a value of the region 10 determined to include a disappeared point in the determination result in the occupancyMap, to a value indicating presence of a patch. That is, the OMap update unit 155 updates the value of the region 10 of the occupancyMap subjected to the filtering process using the fixed filter.

Furthermore, for example, for the region 10 determined to include a disappeared point in the determination result in the occupancyMap, the OMap update unit 155 performs setting so as not to apply the filtering process using the fixed filter. That is, the OMap update unit 155 updates the value of the region 10 of the occupancyMap subjected to the filtering process using the fixed filter.

For example, when the determination result is true in the determination using the formula described above, even if the processing target point disappears, an influence on the quality of the point cloud is small since there are other points to be substituted for the processing target point in C. Therefore, the OMap update unit 155 sets a value indicating absence of a patch for this region B. For example, the OMap update unit 155 applies the filtering process using the fixed filter to the region B. In other words, for the region B, the occupancyMap subjected to the filtering process using the fixed filter is adopted, and the updating is not performed.

On the other hand, in a case of false, since there is no other point to be substituted for the processing target point in C, an influence on the quality of the point cloud may be large if the processing target point disappears. Therefore, the OMap update unit 155 sets a value indicating presence of a patch for this region B. For example, the OMap update unit 155 does not apply the filtering process using the fixed filter to the region B. In other words, for this region B, the occupancyMap subjected to the filtering process using the fixed filter is updated.

By doing in this way, since the disappeared point can be determined in consideration of overlapping of boundaries of a plurality of patches, the occupancyMap can be generated so as to suppress an increase in the disappearance of points in a point cloud. Therefore, it is possible to suppress deterioration in subjective quality of the point cloud.

The OMap update unit 155 may supply the occupancyMap updated as described above to the 2D to 3D conversion unit 152. When acquiring the updated occupancyMap, the 2D to 3D conversion unit 152 performs the above-described conversion process using the updated occupancyMap.

By feeding back the update result in this way, the occupancyMap is recursively updated, and the disappeared point is no longer detected in the disappeared point determination unit 154 in the end. That is, it is no longer necessary for the OMap update unit 155 to update the occupancyMap supplied from the disappeared point determination unit 154. That is, the OMap update unit 155 can generate an occupancyMap capable of suppressing deterioration in subjective quality of a point cloud.

Upon completion of the update of the occupancyMap in this way, the OMap update unit 155 may supply the occupancyMap to the encoding unit 132 (FIG. 6) as a filtered occupancyMap. This occupancyMap may be encoded by the encoding unit 132, multiplexed with other encoded data by the multiplexer 117, and outputted to the outside of the encoding device 100 as a bitstream.

<Flow of Encoding Process>

Figure 8:
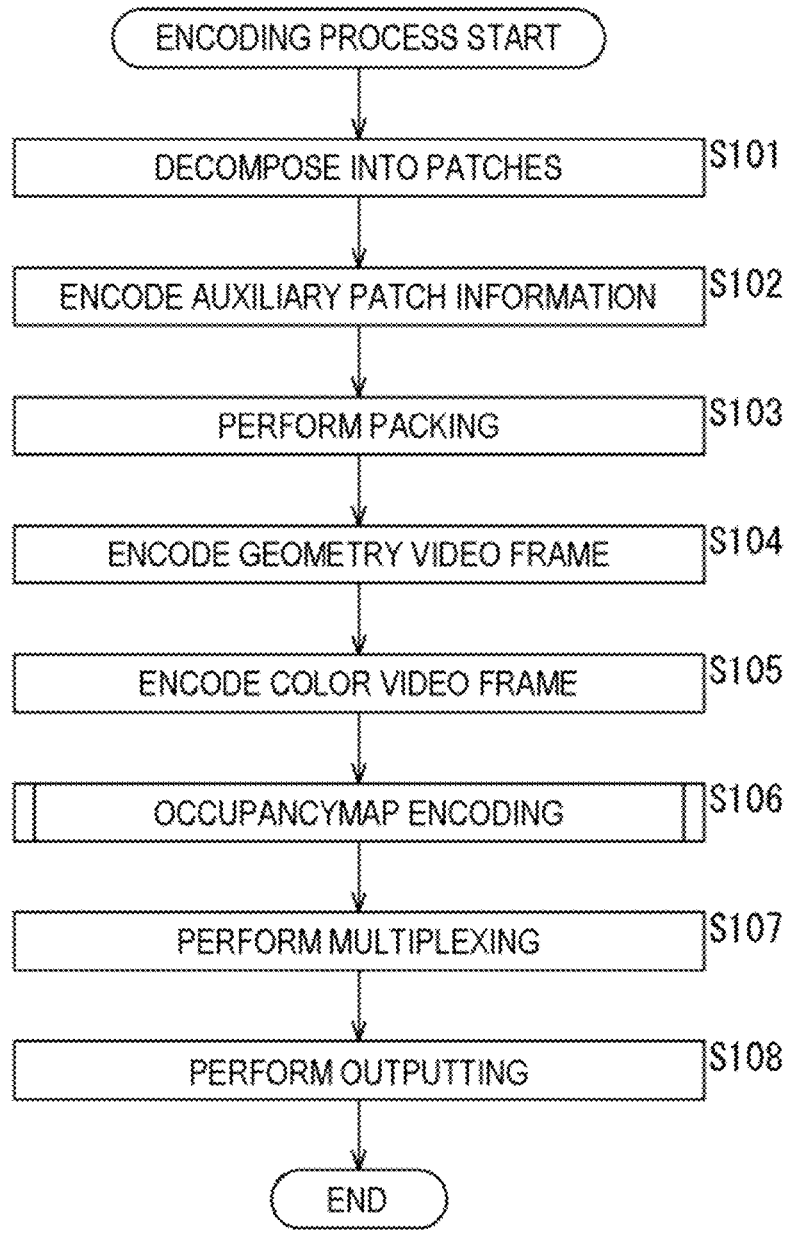
FIG. 8 is a flowchart for explaining an example of a flow of an encoding process.

An example of a flow of an encoding process executed by the encoding device 100 will be described with reference to a flowchart of FIG. 8.

When the encoding process is started, the patch decomposition unit 111 of the encoding device 100 decomposes 3D data (for example, a point cloud) into small regions (connection components) in step S101, and projects data of each small region onto a two-dimensional plane (projection plane), to generate a patch of geometry data and a patch of attribute data.

In step S102, the auxiliary patch information encoding unit 113 encodes auxiliary patch information obtained by the processing in step S101. In step S103, the packing unit 112 packs each patch generated by the processing in step S101, to generate a geometry video frame and a color video frame. Furthermore, in this processing, the packing unit 112 generates an occupancyMap.

In step S104, the video encoding unit 114 encodes the geometry video frame obtained by the processing in step S103, by an encoding method for a two-dimensional image. In step S105, the video encoding unit 115 encodes the color video frame obtained by the processing in step S103, by an encoding method for a two-dimensional image. In step S106, the OMap encoding unit 116 executes an occupancyMap encoding process, to encode the occupancyMap obtained by the processing in step S103.

In step S107, the multiplexer 117 multiplexes the various types of information generated as described above, to generate a bitstream including these pieces of information. In step S108, the multiplexer 117 outputs the bitstream generated by the processing in step S107 to the outside of the encoding device 100. When the processing in step S108 ends, the encoding process ends.

<Flow of occupancyMap Encoding Process>

Figure 9:
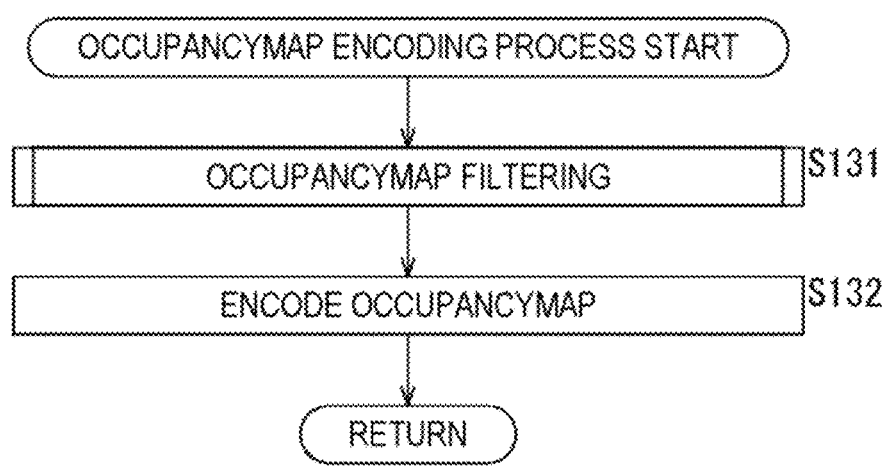
FIG. 9 is a flowchart for explaining an example of a flow of an occupancyMap encoding process.

Next, an example of a flow of an occupancyMap encoding process executed in step S106 in FIG. 8 will be described with reference to a flowchart in FIG. 9.

When the occupancyMap encoding process is started, the filtering processing unit 131 of the OMap encoding unit 116 executes the occupancyMap filtering processing in step S131, to filter the occupancyMap by using the fixed filter.

In step S132, the encoding unit 132 encodes the occupancyMap filtered using the fixed filter in step S131, to generate encoded data of the occupancyMap. When the processing in step S132 ends, the process returns to FIG. 8.

<Flow of occupancyMap Filtering Process>

Figure 10:
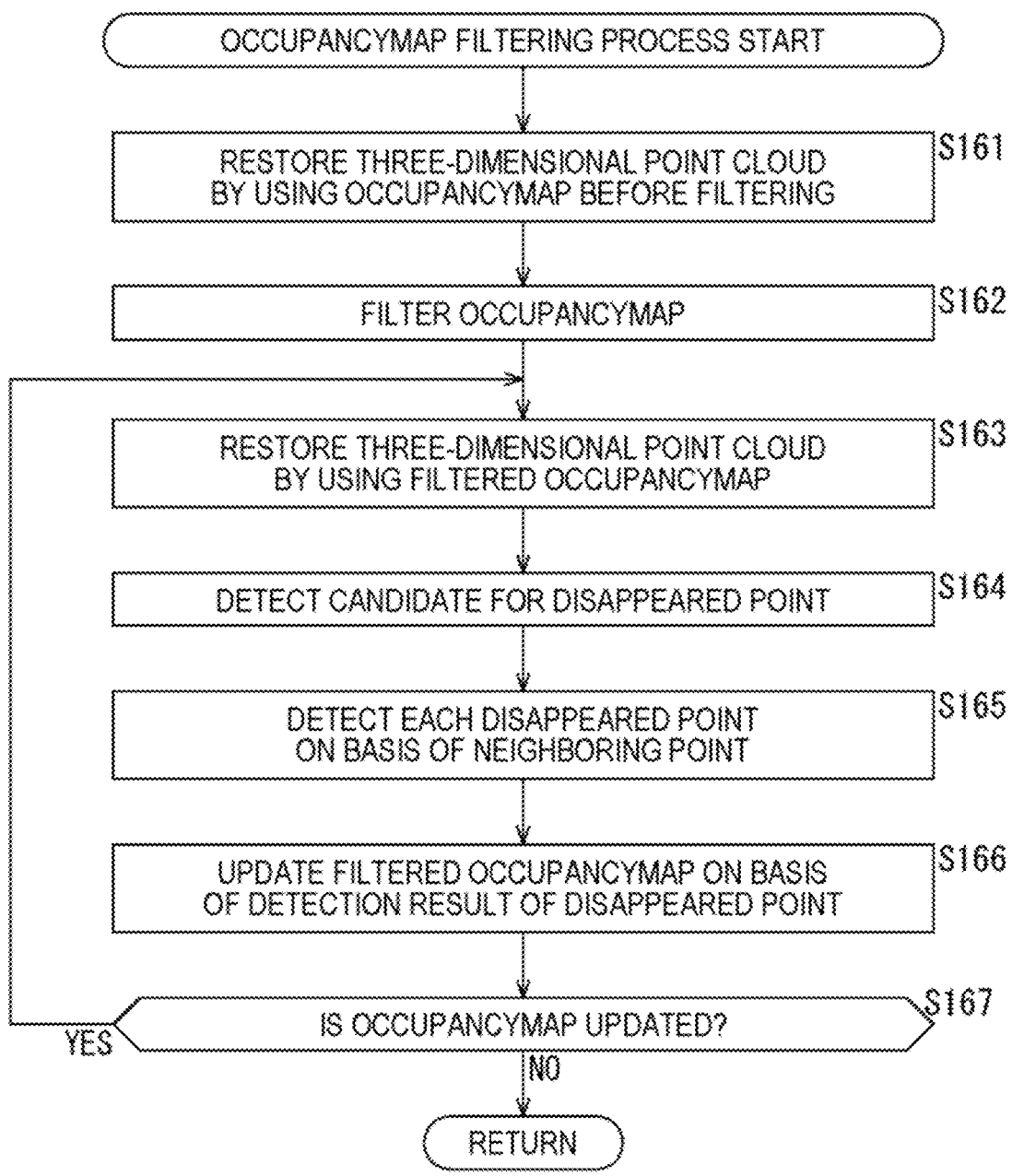
FIG. 10 is a flowchart for explaining an example of a flow of an occupancyMap filtering process.

Next, an example of a flow of an occupancyMap filtering process executed in step S131 of FIG. 9 will be described with reference to a flowchart of FIG. 10.

When the occupancyMap filtering process is started, in step S161, the 2D to 3D conversion unit 153 of the filtering processing unit 131 extracts a patch from a geometry video frame by using an occupancyMap before filtering, converts two-dimensional coordinates of each point included in the patch into three-dimensional coordinates, and restore the geometry data of the point cloud.

In step S162, the OMap filtering application unit 151 performs the filtering process using the fixed filter, on the occupancyMap.

In step S163, by using the occupancyMap generated in the processing in step S162 and subjected to the filtering process using the fixed filter or an occupancyMap updated in the processing in step S166 described later, the 2D to 3D conversion unit 152 extracts a patch from a geometry video frame, converts two-dimensional coordinates of each point included in the patch into three-dimensional coordinates, and restore the geometry data of the point cloud.

In step S164, a candidate for a disappeared point (a region in which the determination of the disappeared point is performed) is detected using the occupancyMap before filtering and the occupancyMap filtered by the processing in step S162.

In step S165, by using the restored geometry data, the disappeared point determination unit 154 detects a disappeared point on the basis of a neighboring point of a processing target point that is to be a candidate for the disappeared point (that is, it is determined whether or not to be a disappeared point for each candidate).

In step S166, the OMap update unit 155 updates as to whether or not to be the disappeared point obtained by the processing in step S165, on the basis of the determination result, for the filtered occupancyMap (including the updated occupancyMap) generated by the processing in step S162.

In step S167, the OMap update unit 155 determines whether or not the occupancyMap has been updated by the processing in step S166. When it is determined that the update has been performed, the process returns to step S163. That is, thereafter, the processing in and after step S163 is executed by using the updated occupancyMap.

As described above, each processing in steps S163 to S167 is repeatedly executed, as necessary. Then, when it is determined in step S167 that the occupancyMap has not been updated, the occupancyMap filtering process ends, and the process returns to FIG. 9.

By executing each processing as described above, the encoding device 100 can generate (update) the occupancyMap in consideration of a configuration of the point cloud on the three-dimensional space while considering overlapping with other patches. As a result, the encoding device 100 can generate (update) and apply the occupancyMap so as to suppress an occurrence of the disappeared point. Therefore, it is possible to suppress deterioration in subjective quality of the point cloud.

3. SECOND EMBODIMENT

<Decoding of Bitstream>

When a bitstream generated as described above is decoded, it is only required to perform unpacking by using the occupancyMap included in the bitstream, to generate (construct) 3D data. By doing in this way, unpacking can be performed using an occupancyMap filtered in consideration of overlapping of boundaries of a plurality of patches. Therefore, it is possible to suppress deterioration in subjective quality of the point cloud.

<Decoding Device>

Figure 11:
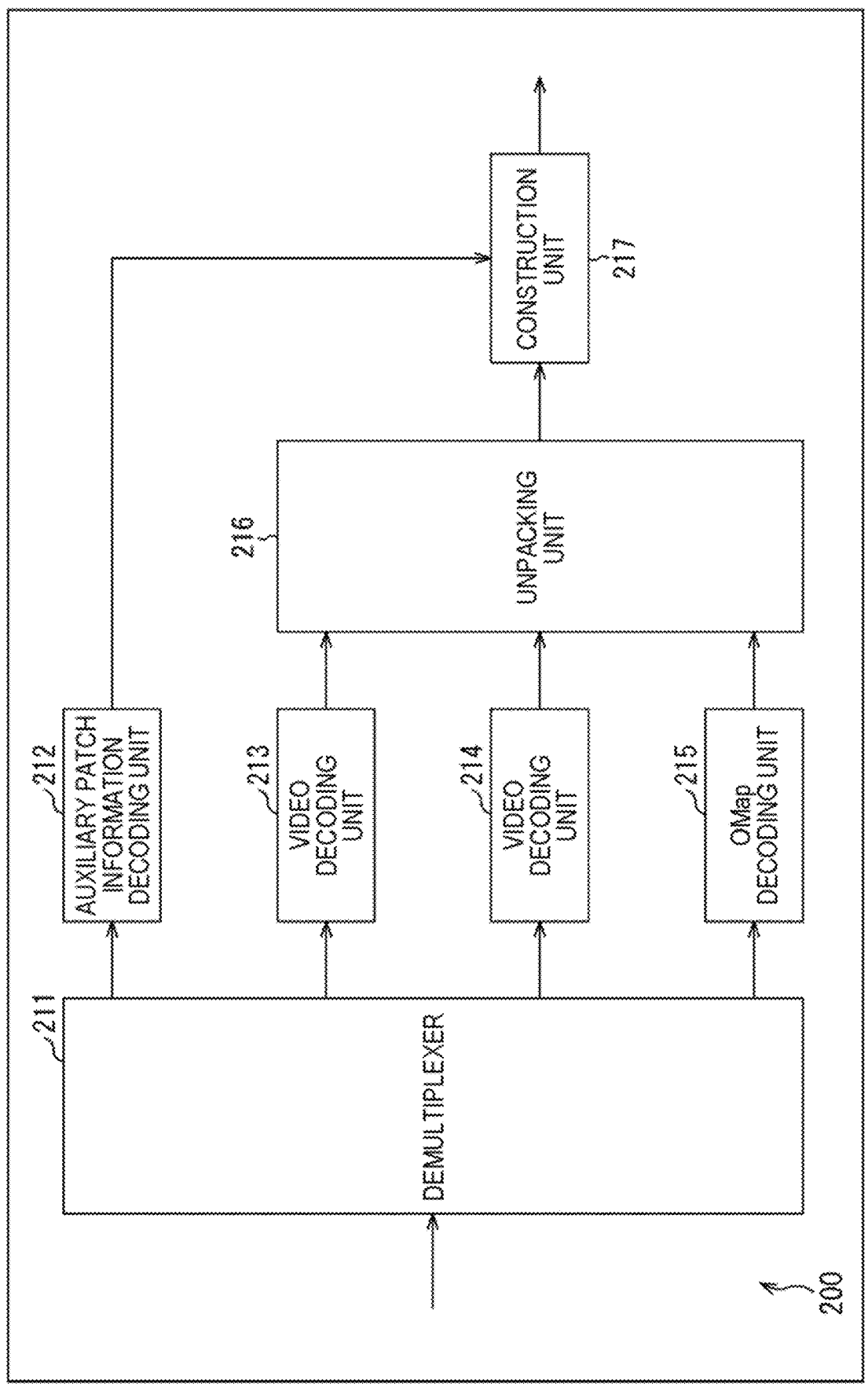
FIG. 11 is a block diagram illustrating a main configuration example of a decoding device.

FIG. 11 is a block diagram illustrating an example of a configuration of a decoding device, which is one mode of an image processing apparatus to which the present technology is applied. A decoding device 200 illustrated in FIG. 11 is a device (a decoding device to which a video-based approach is applied) that constructs 3D data by decoding, with a decoding method for a two-dimensional image, encoded data obtained by projecting 3D data such as a point cloud onto a two-dimensional plane and encoding the 3D data. The decoding device 200 is a decoding device corresponding to the encoding device 100 in FIG. 5, and can construct 3D data by decoding a bitstream generated by the encoding device 100. That is, the decoding device 200 can construct a point cloud by using an occupancyMap generated so as to suppress an occurrence of a disappeared point.

Note that, in FIG. 11, main parts of processing units, data flows, and the like are illustrated, and those illustrated in FIG. 11 are not necessarily all. That is, in the decoding device 200, there may be a processing unit not illustrated as a block in FIG. 11, or there may be a flow of processing or data not illustrated as an arrow or the like in FIG. 11.

As illustrated in FIG. 11, the decoding device 200 includes a demultiplexer 211, an auxiliary patch information decoding unit 212, a video decoding unit 213, a video decoding unit 214, an OMap decoding unit 215, an unpacking unit 216, and a construction unit 217.

The demultiplexer 211 performs processing related to demultiplexing of data. For example, the demultiplexer 211 can acquire a bitstream inputted to the decoding device 200. This bitstream is supplied from the encoding device 100, for example.

Furthermore, the demultiplexer 211 can demultiplex this bitstream. For example, the demultiplexer 211 can extract encoded data of auxiliary patch information from the bitstream by demultiplexing. Furthermore, the demultiplexer 211 can extract encoded data of a geometry video frame from the bitstream by demultiplexing. Moreover, the demultiplexer 211 can extract encoded data of a color video frame from the bitstream by demultiplexing. Furthermore, the demultiplexer 211 can extract encoded data of an occupancyMap from the bitstream by demultiplexing.

Moreover, the demultiplexer 211 can supply the extracted data to a processing unit in a subsequent stage. For example, the demultiplexer 211 can supply the extracted encoded data of the auxiliary patch information to the auxiliary patch information decoding unit 212. Furthermore, the demultiplexer 211 can supply the extracted encoded data of the geometry video frame to the video decoding unit 213. Moreover, the demultiplexer 211 can supply the extracted encoded data of the color video frame to the video decoding unit 214. Furthermore, the demultiplexer 211 can supply the extracted encoded data of the occupancyMap to the OMap decoding unit 215.

Furthermore, the demultiplexer 211 can extract control information regarding packing from the bitstream by demultiplexing, and supply the control information to the unpacking unit 216.

The auxiliary patch information decoding unit 212 performs processing related to decoding of encoded data of auxiliary patch information. For example, the auxiliary patch information decoding unit 212 can acquire encoded data of auxiliary patch information supplied from the demultiplexer 211. Furthermore, the auxiliary patch information decoding unit 212 can decode the encoded data to generate the auxiliary patch information. Moreover, the auxiliary patch information decoding unit 212 can supply the auxiliary patch information to the construction unit 217.

The video decoding unit 213 performs processing related to decoding of encoded data of a geometry video frame. For example, the video decoding unit 213 can acquire encoded data of a geometry video frame supplied from the demultiplexer 211. Furthermore, the video decoding unit 213 can decode the encoded data to generate the geometry video frame. Moreover, the video decoding unit 213 can supply the geometry video frame to the unpacking unit 216.

The video decoding unit 214 performs processing related to decoding of encoded data of a color video frame. For example, the video decoding unit 214 can acquire encoded data of a color video frame supplied from the demultiplexer 211. Furthermore, the video decoding unit 214 can decode the encoded data to generate the color video frame. Moreover, the video decoding unit 214 can supply the color video frame to the unpacking unit 216.

The OMap decoding unit 215 performs processing related to decoding of encoded data of an occupancyMap. For example, the OMap decoding unit 215 can acquire encoded data of an occupancyMap supplied from the demultiplexer 211. Furthermore, the OMap decoding unit 215 can decode the encoded data to generate the occupancyMap. Moreover, the OMap decoding unit 215 can supply the occupancyMap to the unpacking unit 216. In the encoding device 100, the occupancyMap is updated as described in the first embodiment, as necessary.

The unpacking unit 216 performs processing related to unpacking. For example, the unpacking unit 216 can acquire control information regarding packing supplied from the demultiplexer 211. Furthermore, the unpacking unit 216 can acquire a geometry video frame supplied from the video decoding unit 213. Moreover, the unpacking unit 216 can acquire a color video frame supplied from the video decoding unit 214. Furthermore, the unpacking unit 216 can acquire an occupancyMap supplied from the OMap decoding unit 215.

Moreover, the unpacking unit 216 can unpack the geometry video frame and the color video frame on the basis of the control information and the occupancyMap that have been acquired, and extract a patch or the like of the geometry data or the attribute data. Note that, as described above, the occupancyMap is updated as described in the first embodiment, as necessary. That is, the occupancyMap is generated (updated) so as to suppress an occurrence of a disappeared point. Furthermore, the unpacking unit 216 can supply a patch or the like of the geometry data or the attribute data to the 3D reconstruction unit 217.

The construction unit 217 performs processing related to construction of 3D data. For example, the construction unit 217 can acquire auxiliary patch information supplied from the auxiliary patch information decoding unit 212. Furthermore, the construction unit 217 can acquire a patch or the like of geometry data supplied from the unpacking unit 216. Moreover, the construction unit 217 can acquire a patch or the like of attribute data supplied from the unpacking unit 216. Furthermore, the construction unit 217 can acquire an occupancyMap supplied from the unpacking unit 216.

Moreover, the construction unit 217 constructs 3D data (for example, a point cloud) by using these pieces of information. The construction unit 217 outputs the 3D data obtained by such processing to the outside of the decoding device 200. For example, the 3D data is supplied to a display unit to display an image, recorded on a recording medium, or supplied to another device via communication.

Note that these processing units (the demultiplexer 211 to the construction unit 217) have any configuration. For example, each processing unit may be configured by a logic circuit that implements the above-described processing. Furthermore, each of the processing units may include, for example, a CPU, a ROM, a RAM, and the like, and execute a program by using them to implement the above-described processing. Of course, each processing unit may have both of the configurations, implement a part of the above-described processing by the logic circuit, and implement other by executing the program. The configurations of the processing units may be independent from each other and, for example, some processing units may implement a part of the above-described processing by the logic circuit, some other processing units may implement the above-described processing by executing the program, and still some other processing units may implement the above-described processing by both the logic circuit and the execution of the program.

As described above, the unpacking unit 216 can perform unpacking so as to suppress an occurrence of a disappeared point, by extracting a patch by using an occupancyMap supplied from the encoding device 100. Therefore, the decoding device 200 may construct a point cloud so as to suppress deterioration in subjective quality.

<Flow of Decoding Process>

Figure 12:
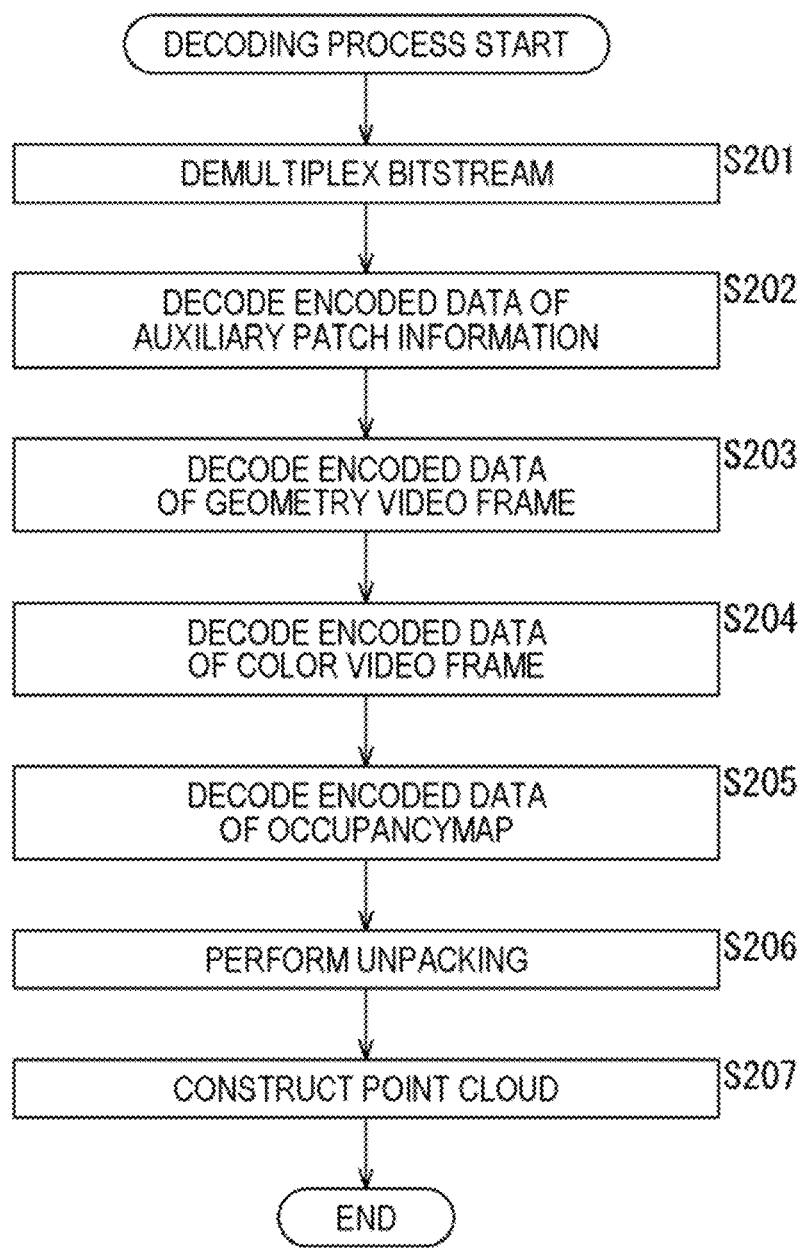
FIG. 12 is a flowchart for explaining an example of a flow of a decoding process.

An example of a flow of a decoding process executed by such the decoding device 200 will be described with reference to a flowchart of FIG. 12.

When the decoding process is started, the demultiplexer 211 of the decoding device 200 demultiplexes a bitstream in step S201. In step S202, the auxiliary patch information decoding unit 212 decodes encoded data of auxiliary patch information extracted from the bitstream by the processing in step S201.

In step S203, the video decoding unit 213 decodes encoded data of a geometry video frame extracted from the bitstream by the processing in step S201. In step S204, the video decoding unit 214 decodes encoded data of a color video frame extracted from the bitstream by the processing in step S201. In step S205, the OMap decoding unit 215 decodes encoded data of an occupancyMap extracted from the bitstream by the processing in step S201.

In step S206, the unpacking unit 216 unpacks each of the geometry video frame and the color video frame on the basis of control information related to the packing and on the basis of the occupancyMap.

In step S207, the construction unit 217 constructs 3D data such as a point cloud, for example, on the basis of the auxiliary patch information generated by the processing in step S202 and the various types of information generated by the processing in step S206. When the processing in step S207 ends, the decoding process ends.

As described above, by executing each processing, the decoding device 200 can perform unpacking so as to suppress an occurrence of a disappeared point, and can construct a point cloud so as to suppress deterioration in subjective quality.

4. SUPPLEMENTARY NOTE

<Computer>

The series of processes described above can be executed by hardware or also executed by software. When the series of processes are performed by software, a program that configures the software is installed in a computer. Here, examples of the computer include, for example, a computer that is built in dedicated hardware, a general-purpose personal computer that can perform various functions by being installed with various programs, and the like.

Figure 13:
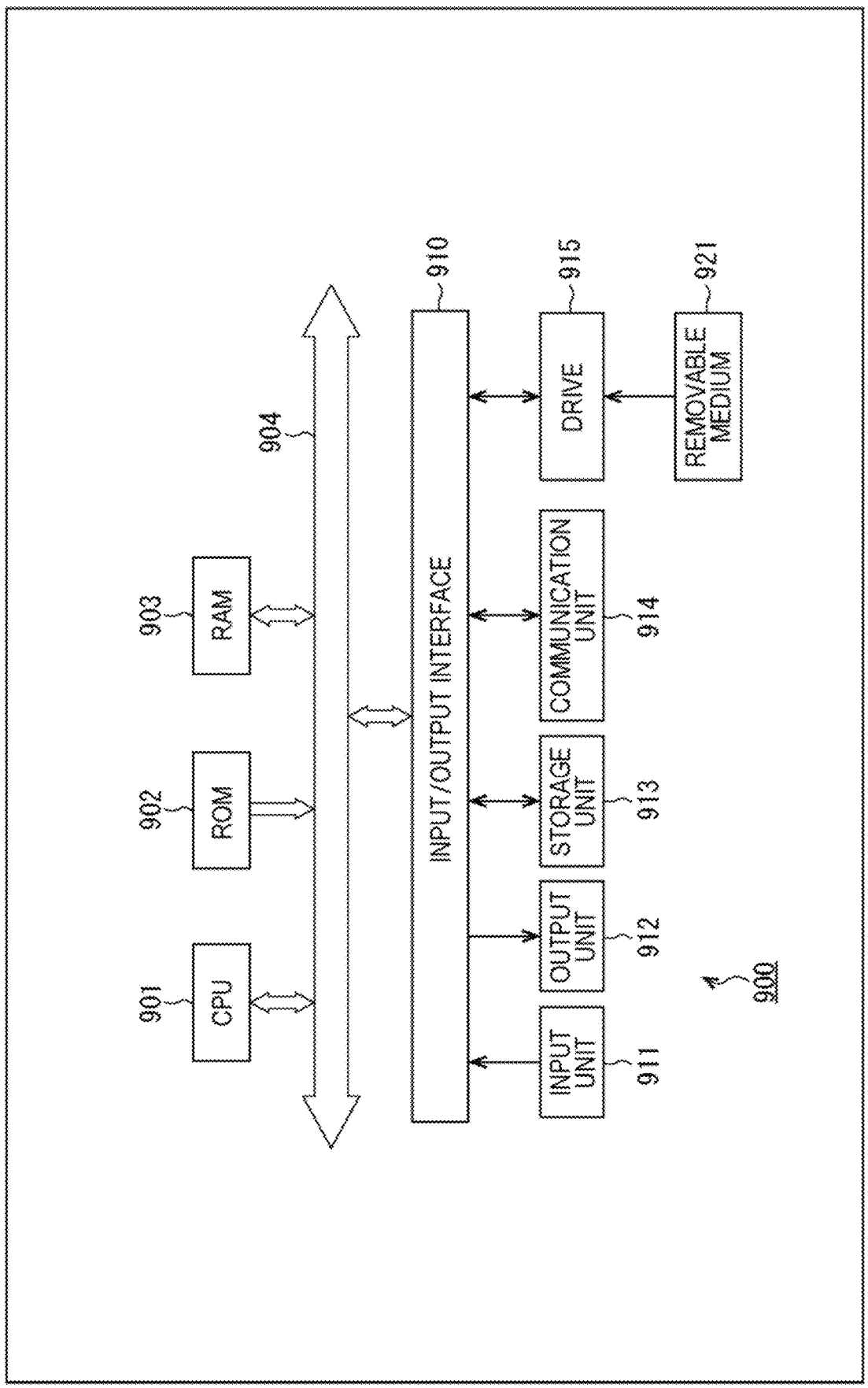
FIG. 13 is a block diagram illustrating a main configuration example of a computer.

FIG. 13 is a block diagram illustrating a configuration example of hardware of a computer that executes the series of processes described above in accordance with a program.

In a computer 900 illustrated in FIG. 13, a central processing unit (CPU) 901, a read only memory (ROM) 902, and a random access memory (RAM) 903 are mutually connected via a bus 904.

The bus 904 is further connected with an input/output interface 910. To the input/output interface 910, an input unit 911, an output unit 912, a storage unit 913, a communication unit 914, and a drive 915 are connected.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface or the like. The drive 915 drives a removable medium 921 such as a magnetic disk, an optical disk, a magneto-optical disk, or a semiconductor memory.

In the computer configured as described above, the series of processes described above are performed, for example, by the CPU 901 loading a program recorded in the storage unit 913 into the RAM 903 via the input/output interface 910 and the bus 904, and executing. The RAM 903 also appropriately stores data necessary for the CPU 901 to execute various processes, for example.

The program executed by the computer can be applied by being recorded on, for example, the removable medium 921 as a package medium or the like. In this case, by attaching the removable medium 921 to the drive 915, the program can be installed in the storage unit 913 via the input/output interface 910.

Furthermore, this program can also be provided via a wired or wireless transmission medium such as a local area network, the Internet, or digital satellite broadcasting. In this case, the program can be received by the communication unit 914 and installed in the storage unit 913.

Besides, the program can be installed in advance in the ROM 902 and the storage unit 913.

<Applicable Target of Present Technology>

The case where the present technology is applied to encoding and decoding of point cloud data has been described above, but the present technology can be applied to encoding and decoding of 3D data of any standard without limiting to these examples. That is, as long as there is no contradiction with the present technology described above, any specifications may be adopted for various types of processing such as an encoding and decoding method and various types of data such as 3D data and metadata. Furthermore, as long as there is no contradiction with the present technology, some processes and specifications described above may be omitted.

Furthermore, in the above description, the encoding device 100 and the decoding device 200 have been described as application examples of the present technology, but the present technology can be applied to any configuration.

For example, the present technology may be applied to various electronic devices such as a transmitter or a receiver (for example, a television receiver or a mobile phone) in satellite broadcasting, cable broadcasting such as cable TV, distribution on the Internet, and distribution to a terminal by cellular communication, or a device (for example, a hard disk recorder or a camera) that records an image on a medium such as an optical disk, a magnetic disk, or a flash memory, or reproduces an image from these storage media.

Furthermore, for example, the present technology can also be implemented as a partial configuration of a device such as: a processor (for example, a video processor) as a system large scale integration (LSI) or the like; a module (for example, a video module) using a plurality of processors or the like; a unit (for example, a video unit) using a plurality of modules or the like; or a set (for example, a video set) in which other functions are further added to the unit.

Furthermore, for example, the present technology can also be applied to a network system including a plurality of devices. For example, the present technology may be implemented as cloud computing that performs processing in sharing and in cooperation by a plurality of devices via a network. For example, for any terminal such as a computer, an audio visual (AV) device, a portable information processing terminal, or an Internet of Things (IoT) device, the present technology may be implemented in a cloud service that provides a service related to an image (moving image).

Note that, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

<Field and Application to which Present Technology is Applicable>

A system, a device, a processing unit, a point cloud, and the like to which the present technology is applied can be used in any fields such as, for example, a game, augmented reality (AR), virtual reality (VR), automatic driving, traffic monitoring, medical care, crime prevention, agriculture, livestock industry, mining, beauty care, factories, home appliances, weather, and nature monitoring. Furthermore, any application may be adopted in each field. For example, it may also be used for producing volumetric video, 6 degrees of freedom (DoF) media, and the like.

<Others>

Note that, in this specification, "flag" is information for identifying a plurality of states, and includes not only information to be used for identifying two states of true (1) or false (0), but also information that enables identification of three or more states. Therefore, a value that can be taken by the "flag" may be, for example, a binary value of I/O, or may be a ternary value or more. That is, the number of bits included in the "flag" can take any number, and may be 1 bit or a plurality of bits. Furthermore, for the identification information (including the flag), in addition to a form in which the identification information is included in a bitstream, a form is assumed in which difference information of the identification information with respect to a certain reference information is included in the bitstream. Therefore, in this specification, the "flag" and the "identification information" include not only the information thereof but also the difference information with respect to the reference information.

Furthermore, various kinds of information (such as metadata) related to coded data (a bitstream) may be transmitted or recorded in any form as long as it is associated with the coded data. Here, the term "associating" means, when processing one data, allowing other data to be used (to be linked), for example. That is, the data associated with each other may be combined as one data or may be individual data. For example, information associated with coded data (an image) may be transmitted on a transmission line different from the coded data (the image). Furthermore, for example, information associated with the coded data (the image) may be recorded on a recording medium different from the coded data (the image) (or another recording region of the same recording medium). Note that this "association" may be for a part of the data, rather than the entire data. For example, an image and information corresponding to the image may be associated with each other in any unit such as a plurality of frames, one frame, or a part within a frame.

Note that, in the present specification, terms such as "combine", "multiplex", "add", "integrate", "include", "store", "put in", "introduce", "insert", and the like mean, for example, to combine a plurality of objects into one, such as to combine encoded data and metadata into one data, and mean one method of "associating" described above.

Furthermore, the embodiments of the present technology are not limited to the above-described embodiments, and various modifications can be made without departing from the scope of the present technology.

For example, a configuration described as one device (or processing unit) may be divided and configured as a plurality of devices (or processing units). On the contrary, a configuration described above as a plurality of devices (or processing units) may be collectively configured as one device (or processing unit). Furthermore, as a matter of course, a configuration other than the above may be added to a configuration of each device (or each processing unit). Moreover, as long as a configuration and an operation of the entire system are substantially the same, a part of a configuration of one device (or processing unit) may be included in a configuration of another device (or another processing unit).

Furthermore, for example, the above-described program may be executed in any device. In that case, the device is only required to have a necessary function (a functional block or the like) such that necessary information can be obtained.

Furthermore, for example, each step of one flowchart may be executed by one device, or may be shared and executed by a plurality of devices. Moreover, when one step includes a plurality of processes, the plurality of processes may be executed by one device or may be shared and executed by a plurality of devices. In other words, a plurality of processes included in one step can be executed as a plurality of steps. On the contrary, a process described as a plurality of steps can be collectively executed as one step.

Furthermore, for example, in a program executed by the computer, processing of steps describing the program may be executed in chronological order in the order described in this specification, or may be executed in parallel or individually at a required timing such as when a call is made. That is, as long as no contradiction occurs, processing of each step may be executed in an order different from the order described above. Moreover, this processing of steps describing program may be executed in parallel with processing of another program, or may be executed in combination with processing of another program.

Furthermore, for example, a plurality of techniques related to the present technology can be implemented independently as a single body as long as there is no contradiction. Of course, any of the plurality of present technologies can be used in combination. For example, a part or all of the present technology described in any embodiment can be implemented in combination with a part or all of the present technology described in another embodiment. Furthermore, a part or all of the present technology described above may be implemented in combination with another technology not described above.

Note that the present technology can also have the following configurations.

(1) An information processing apparatus including:

a generation unit configured to generate an occupancyMap indicating, for each local area of a frame image, presence or absence of a projection image of a point cloud on a two-dimensional plane in accordance with a positional relationship of points in a three-dimensional space, the point cloud representing an object having a three-dimensional shape as a set of the points.

(2) The information processing apparatus according to (1), further including:

a determination unit configured to determine whether or not each of the points is a disappeared point in accordance with a positional relationship with a neighboring point in a three-dimensional space, the disappeared point being a point that disappears when the projection image is extracted from the frame image by using the occupancyMap, in which the generation unit sets a value of the local area of the occupancyMap on the basis of a determination result by the determination unit.

(3) The information processing apparatus according to (2), in which the generation unit sets a value of the local area including each of the points determined to be the disappeared point by the determination unit, to a value indicating presence of the projection image.

(4) The information processing apparatus according to (2) or (3), in which for the local area including each of the points determined to be the disappeared point by the determination unit, the generation unit inhibits application of a filtering process of setting a value of the local area having a small proportion of the projection image in the occupancyMap to a value indicating absence of a projection image.

(5) The information processing apparatus according to any one of (2) to (4), in which the determination unit determines whether or not each of the points is a disappeared point for each point of the local area for which a value indicating presence of the projection image is set in the occupancyMap not subjected to the filtering process while a value indicating absence of the projection image is set in the occupancyMap subjected to the filtering process, the filtering process being of setting a value of the local area having a small proportion of the projection image in the occupancyMap to a value indicating absence of the projection image.

(6) The information processing apparatus according to any one of (2) to (5), in which the determination unit determines whether or not each of the points is a disappeared point in accordance with a distance between each of the points and the neighboring point.

(7) The information processing apparatus according to (6), in which the determination unit determines that each of the points is not a disappeared point when a distance between each of the points and the neighboring point is equal to or less than a predetermined threshold value.

(8) The information processing apparatus according to (7), in which the determination unit determines that each of the points is not a disappeared point when a distance between each of the points and the neighboring point in a three-dimensional space is equal to or less than a predetermined threshold value.

(9) The information processing apparatus according to (7) or (8), in which the determination unit determines that each of the points is not a disappeared point when a distance between each of the points and the neighboring point on a projection plane is equal to or less than a predetermined threshold value.

(10) The information processing apparatus according to any one of (7) to (9), in which the determination unit determines that each of the points is not a disappeared point when a distance between each of the points and the neighboring point in a normal direction of a projection plane is equal to or less than a predetermined threshold value.

(11) The information processing apparatus according to any one of (6) to (10), in which the determination unit determines that each of the points is not a disappeared point when a number of points whose distance from each of the points is equal to or less than a predetermined threshold value is equal to or more than a predetermined threshold value.

(12) The information processing apparatus according to (11), in which the determination unit determines whether or not to be the disappeared point by using the predetermined threshold value corresponding to a position of the point.

(13) The information processing apparatus according to any one of (5) to (12), further including:

a conversion unit configured to extract the projection image from a frame image by using each of the occupancyMap not subjected to the filtering process and the occupancyMap subjected to the filtering process, the conversion unit being configured to convert two-dimensional coordinates of each point included in the extracted projection image into three-dimensional coordinates, in which by comparing three-dimensional coordinates of each point included in the projection image extracted using the occupancyMap not subjected to the filtering process, the three-dimensional coordinates being derived by the transform unit, with three-dimensional coordinates of each point included in the projection image extracted using the occupancyMap subjected to the filtering process, the three-dimensional coordinates being derived by the transform unit, the determination unit detects the local area in which a value indicating presence of the projection image is set in the occupancyMap not subjected to the filtering process while a value indicating absence of the projection image is set in the occupancyMap subjected to the filtering process, and the determination unit determines whether or not to be a disappeared point for each point of the detected local area.

(14) The information processing apparatus according to (13), in which the conversion unit performs a smoothing process on the point cloud.

(15) The information processing apparatus according to (13) or (14), further including:

a filtering processing unit configured to perform the filtering process on the occupancyMap, in which the conversion unit extracts the projection image from the frame image by using the occupancyMap not subjected to the filtering process, converts two-dimensional coordinates of each point included in the extracted projection image into three-dimensional coordinates, further extracts the projection image from the frame image by using the occupancyMap subjected to the filtering process by the filtering processing unit, and converts two-dimensional coordinates of each point included in the extracted projection image into three-dimensional coordinates.

(16) The information processing apparatus according to any one of (1) to (15), in which the local area has lower accuracy than a resolution of the points.

(17) The information processing apparatus according to any one of (1) to (16), further including:

an occupancyMap encoding unit configured to encode a moving image including a frame image and including the occupancyMap generated by the generation unit, to generate encoded data of the occupancyMap.

(18) An information generation method including:

generating an occupancyMap indicating, for each local area of a frame image, presence or absence of a projection image of a point cloud on a two-dimensional plane in accordance with a positional relationship of points in a three-dimensional space, the point cloud representing an object having a three-dimensional shape as a set of the points.

(19) An information processing apparatus including:

an extraction unit configured to extract a projection image of geometry data and a projection image of attribute data of a point cloud from a frame image by using an occupancyMap that is generated in accordance with a positional relationship of points in a three-dimensional space of the point cloud representing an object having a three-dimensional shape as a set of the points, the occupancyMap indicating, for each local area of a frame image, presence or absence of a projection image of the point cloud on a two-dimensional plane; and a generation unit configured to generate the point cloud by using the projection image of the geometry data and the projection image of the attribute data that have been extracted by the extraction unit.

(20) An information generation method including:

extracting, from a frame image, a projection image of geometry data and a projection image of attribute data of a point cloud by using an occupancyMap that is generated in accordance with a positional relationship of points in a three-dimensional space of a point cloud representing an object having a three-dimensional shape as a set of the points, the occupancyMap indicating, for each local area of a frame image, presence or absence of a projection image of the point cloud on a two-dimensional plane; and generating the point cloud by using the projection image of the geometry data and the projection image of the attribute data that have been extracted.

REFERENCE SIGNS LIST

100 Encoding device
111 Patch decomposition unit
112 Packing unit
113 Auxiliary patch information encoding unit
114 Video encoding unit
115 Video encoding unit
116 OMap encoding unit
117 Multiplexer
131 Filtering processing unit
132 Encoding unit
151 OMap filtering application unit
152 2D to 3D conversion unit
153 2D to 3D conversion unit
154 Disappeared point determination unit
155 OMap update unit
200 Decoding device
211 Demultiplexer
212 Auxiliary patch information decoding unit
213 Video decoding unit
214 Video decoding unit
215 OMap decoding unit
216 Unpacking unit
217 Construction unit

The invention claimed is:

1. An information processing apparatus comprising:
circuitry configured to
generate an occupancyMap indicating, for each local area of a frame image, presence or absence of a projection image of a point cloud on a two-dimensional plane in accordance with a positional relationship of points in a three-dimensional space, the point cloud representing an object having a three-dimensional shape as a set of the points;
determine whether a plurality of the points includes a disappeared point in accordance with a positional relationship with a neighboring point in a three-dimensional space, the disappeared point being a point that disappears when the projection image is extracted from the frame image by using the occupancyMap; and set a value of the local area of the occupancyMap on the basis of a determination that the plurality of the points includes the disappeared point.

2. The information processing apparatus according to claim 1, wherein the circuitry is further configured to set a value of the local area including the plurality of the points determined to include the disappeared point, to a value indicating presence of the projection image.

3. The information processing apparatus according to claim 1, wherein for the local area including the plurality of the points determined to include the disappeared point, the circuitry is further configured to inhibit application of a filtering process of setting a value of the local area having a small proportion of the projection image of the occupancyMap to a value indicating absence of the projection image.

4. The information processing apparatus according to claim 1, wherein the circuitry is further configured to determine whether each of the points is the disappeared point for each point of the local area for which a value indicating presence of the projection image is set in the occupancyMap not subjected to a filtering process while a value indicating absence of the projection image is set in the occupancyMap subjected to the filtering process, the filtering process being of setting a value of the local area having a small proportion of the projection image in the occupancyMap to a value indicating absence of the projection image.

5. The information processing apparatus according to claim 4, wherein the circuitry is further configured to extract the projection image from a frame image by using each of the occupancyMap not subjected to the filtering process and the occupancyMap subjected to the filtering process;

convert two-dimensional coordinates of each point included in the projection image that is extracted into three-dimensional coordinates;

by comparing the three-dimensional coordinates of each point included in the projection image extracted using the occupancyMap not subjected to the filtering process, with the three-dimensional coordinates of each point included in the projection image extracted using the occupancyMap subjected to the filtering process, detect the local area in which a value indicating presence of the projection image is set in the occupancyMap not subjected to the filtering process while a value indicating absence of the projection image is set in the occupancyMap subjected to the filtering process; and determine whether each of the points is the disappeared point for each point of the local area that is detected.

6. The information processing apparatus according to claim 5, wherein the circuitry is further configured to perform a smoothing process on the point cloud.

7. The information processing apparatus according to claim 5, wherein the circuitry is further configured to perform the filtering process on the occupancyMap;

extract the projection image from the frame image by using the occupancyMap not subjected to the filtering process;

convert the two-dimensional coordinates of each point included in the projection image that is extracted into the three-dimensional coordinates;

further extract the projection image from the frame image by using the occupancyMap subjected to the filtering process; and further convert the two-dimensional coordinates of each point included in the projection image that is further extracted into the three-dimensional coordinates.

8. The information processing apparatus according to claim 1, wherein the circuitry is further configured to determine whether the plurality of the points includes the disappeared point in accordance with a distance between each of the plurality of the points and the neighboring point.

9. The information processing apparatus according to claim 8, wherein the circuitry is further configured to determine that the plurality of the points does not include the disappeared point when the distance between each of the plurality of the points and the neighboring point is equal to or less than a predetermined threshold value.

10. The information processing apparatus according to claim 9, wherein the circuitry is further configured to determine that the plurality of the points does not include the disappeared point when the distance between each of the plurality of the points and the neighboring point in a three-dimensional space is equal to or less than a predetermined threshold value.

11. The information processing apparatus according to claim 9, wherein the circuitry is further configured to determine that the plurality of the points does not include the disappeared point when the distance between each of the plurality of the points and the neighboring point on a projection plane is equal to or less than a predetermined threshold value.

12. The information processing apparatus according to claim 9, wherein the circuitry is further configured to determine that the plurality of the points does not include the disappeared point when the distance between each of the plurality of the points and the neighboring point in a normal direction of a projection plane is equal to or less than a predetermined threshold value.

13. The information processing apparatus according to claim 8, wherein the circuitry is further configured to determine that the plurality of the points does not include the disappeared point when the number of the plurality of the points whose distance from each of the points to the neighboring point is equal to or less than a predetermined threshold value is equal to or more than a predetermined threshold value.

14. The information processing apparatus according to claim 13, wherein the circuitry is further configured to determine whether the plurality of the points includes the disappeared point by using the predetermined threshold value corresponding to a position of each of the plurality of the points.

15. The information processing apparatus according to claim 1, wherein
the local area has lower accuracy than a resolution of the points.

16. The information processing apparatus according to claim 1, wherein
the circuitry is further configured to encode a moving image including a frame image and including the occupancyMap and to generate encoded data of the occupancyMap.

17. An information generation method comprising:
generating an occupancyMap indicating, for each local area of a frame image, presence or absence of a projection image of a point cloud on a two-dimensional plane in accordance with a positional relationship of points in a three-dimensional space, the point cloud representing an object having a three-dimensional shape as a set of the points;
determining whether a plurality of the points includes a disappeared point in accordance with a positional relationship with a neighboring point in a three-dimensional space, the disappeared point being a point that disappears when the projection image is extracted from the frame image by using the occupancyMap; and
setting a value of the local area of the occupancyMap on the basis of a determination that the plurality of the points includes the disappeared point.

18. An information processing apparatus comprising:
circuitry configured to
extract a projection image of geometry data of a point cloud and a projection image of attribute data of the point cloud from a frame image by using an occupancyMap that is generated in accordance with a positional relationship of points in a three-dimensional space, the point cloud representing an object having a three-dimensional shape as a set of the points, and the occupancyMap indicating, for each local area of a frame image, presence or absence of a projection image of the point cloud on a two-dimensional plane; and
generate the point cloud by using the projection image of the geometry data and the projection image of the attribute data that have been extracted, wherein
a value of the local area of the occupancyMap is set on the basis of a determination that a plurality of the points includes a disappeared point, the determination being made in accordance with a positional relationship with a neighboring point in a three-dimensional space, and the disappeared point being a point that disappears when the projection image is extracted from the frame image by using the occupancyMap.

19. An information generation method comprising:
extracting, from a frame image, a projection image of geometry data of a point cloud and a projection image of attribute data of the point cloud by using an occupancyMap that is generated in accordance with a positional relationship of points in a three-dimensional space, a point cloud representing an object having a three-dimensional shape as a set of the points, and the occupancyMap indicating, for each local area of a frame image, presence or absence of a projection image of the point cloud on a two-dimensional plane; and
generating the point cloud by using the projection image of the geometry data and the projection image of the attribute data that have been extracted wherein
a value of the local area of the occupancyMap is set on the basis of a determination that a plurality of the points includes a disappeared point, the determination being made in accordance with a positional relationship with a neighboring point in a three-dimensional space, and the disappeared point being a point that disappears when the projection image is extracted from the frame image by using the occupancyMap.

* * * * *